US007170562B2

(12) United States Patent
Yoo et al.

(10) Patent No.: US 7,170,562 B2
(45) Date of Patent: Jan. 30, 2007

(54) APPARATUS AND METHOD FOR DEINTERLACE VIDEO SIGNAL

(75) Inventors: Dae-Woon Yoo, Seoul (KR); Du-Sik Yang, Seoul (KR)

(73) Assignee: Macro Image Technology, Inc., Seoul (KR)

( * ) Notice: Subject to any disclaimer, the term of this patent is extended or adjusted under 35 U.S.C. 154(b) by 522 days.

(21) Appl. No.: 10/778,533

(22) Filed: Feb. 17, 2004

(65) Prior Publication Data

US 2004/0233326 A1 Nov. 25, 2004

(30) Foreign Application Priority Data

May 19, 2003 (KR) ...................... 10-2003-0031579

(51) Int. Cl.
*H04N 7/01* (2006.01)
(52) U.S. Cl. ..................................... 348/452; 348/448
(58) Field of Classification Search ........ 348/448–452, 348/458, 444
See application file for complete search history.

(56) References Cited

U.S. PATENT DOCUMENTS

| 4,992,869 | A | * | 2/1991 | Samad et al. ............... 348/451 |
| 5,600,377 | A | * | 2/1997 | David et al. ................ 348/452 |
| 5,929,918 | A |   | 7/1999 | Marques Pereira et al. |
| 6,072,531 | A | * | 6/2000 | Shibano ...................... 348/448 |
| 6,262,773 | B1 |  | 7/2001 | Westerman |
| 6,985,187 | B2 | * | 1/2006 | Han et al. ................... 348/452 |

* cited by examiner

*Primary Examiner*—Michael H. Lee
(74) *Attorney, Agent, or Firm*—Jacobson Holman PLLC

(57) ABSTRACT

There is provided an image signal deinterlacing apparatus for converting an interlaced scanning image into a progressive scanning image. The deinterlacing apparatus includes: an intra-field pixel processing unit for detecting a face area and a to-be-interpolated data within a field by using pixels of a field disposed before two field from a current field; a motion value generating unit for detecting first to third motion values and first and second motion degree values; a history control unit for detecting a history value; a fast image processing unit for detecting a fast motion image; a film image processing unit for detecting a film image and a caption area and determining a to-be-interpolated field data; a still image processing unit for accumulating the first motion value and the second motion degree value to detect a still image; an inter-field noise image processing unit for detecting an adjacent inter-field noise image; a motion boundary maintenance image processing unit for detecting a motion boundary maintenance image; and a synthesizing unit for selectively interpolating the intra-field to-be-interpolated data, the before-one-field inter-field data and the before-three-field inter-field data according to the detection result.

19 Claims, 15 Drawing Sheets

APPARATUS AND METHOD FOR DEINTERLACE VIDEO SIGNAL

BACKGROUND OF THE INVENTION

1. Field of the Invention

The present invention relates to a method for deinterlacing video signals, and more particularly, to an apparatus and method for deinterlacing video signals, in which clearer picture quality can be secured by solving a variety of phenomena, such as step pattern image, horizontal moire pattern afterimage, noise and the like, which occur when an interlaced scanning image consisting of fields is converted into a progressive scanning image consisting of the same number of frames according to image modes. In addition, a still image, a film mode image and a caption image can be displayed in a resolution close to a photograph and also restored closely to an original image, thereby improving a picture quality.

2. Description of the Related Art

Generally, a display of interlaced scanning images is implemented by alternating odd fields (i.e., an odd line group of screen) and even fields (i.e., an even line group of screen) with a predetermined time difference.

An interlaced scanning system includes a typical analog television, a video camera, a video cassette recorder (VCR) and the like. The system's signal processing, such as transmission, storage and display, is performed in the interlaced scanning method. In digital televisions of ATSC standard, 1920×1080i and 720×480i formats are based on the interlaced scanning method. A progressive scanning system is focused on personal computers (PCs) and a display of most PCs is achieved using the progressive scanning method. In digital televisions, 1920×1080p, 1280×720p and 720×480p formats are based on the progressive scanning method. The reason why the image processing is classified into two methods, i.e., the interlaced scanning method and the progressive scanning method is that contents of to-be-displayed images are different from each other. In other words, in case the same frequency bandwidth is given, the interlaced scanning method is advantageous to the display of moving images because it can provide an excellent picture quality. Meanwhile, the progressive scanning method is advantageous to the display of PC images having a large number of lines, dots and still images.

However, in case the moving images and the PC images are simultaneously displayed on one device, it is usual to employ the progressive scanning method. The reason is that degradation of the picture quality is conspicuous when the still images consisting of dots and lines are displayed based on the interlaced scanning method. In addition, the scanning method is different according to the display devices. A display device employing CRT that is widely used in TVs must perform a high voltage deflection. Therefore, the interlaced scanning method using a low horizontal frequency is advantageous to slightly vary a high voltage current. On the other hand, a flat panel display device employing PDP, LCD and DLP does not perform the high voltage deflection. Accordingly, the flat panel display device uses the progressive scanning method rather than the interlaced scanning method, since the interlaced scanning method has drawbacks of line flicker, large area flicker, detection of a scanning line, and the like.

In the digital era, most images are processed in a digital mode. The digitally processed images may be stored in HDD of PC or displayed on PC screen. Meanwhile, there are many users who want to display PC images on TV screens. With the advance of large-sized screen/high definition in a digital TV era, the focus gradually moves from the CRT based display to the flat panel display, since the flat panel display is light in weight and can provide a large-sized screen.

For these reasons, a deinterlace process is required which converts the interlaced scanning moving images into the progressive scanning moving image. A line repetition method, an intra-field interpolation method, an inter-field interpolation method and a motion adaptive interpolation method are proposed for implementing the deinterlace process with simple hardware.

According to the line repetition method, a line to be interpolated is generated by repeating a line disposed above in the same field. Although the line repetition method can be implemented with the simplest hardware, it has a disadvantage that degrades the picture quality since a boundary of an inclined line seems a stepped shape after the interpolation.

According to the intra-field interpolation method, pixels disposed below and above in the same field as a pixel to be interpolated are used to obtain pixel value to be interpolated through an arithmetical calculation such as addition and division. The intra-field interpolation method can reduce the step phenomenon much more than the line repetition method. However, the intra-field interpolation method makes frames by using only information on one field with respect to the still image, thus lowering a vertical resolution by half.

The inter-field interpolation method is performed by taking and inserting the line disposed at the same position of a just previous field into the to-be-interpolated line of a current field. The inter-field interpolation method can obtain an excellent vertical resolution with respect to the still image. However, since this is similar to the overlap of two images, whose timings are somewhat different from each other, the inter-field interpolation method has a disadvantage in that the flicker may occur in a screen when the moving image is entirely displayed. Further, the horizontal moire pattern afterimages may occur in a motion direction of objects in a screen when the moving image is locally displayed.

According to the motion adaptive interpolation method, motion states of adjacent pixels are detected at a position of a pixel to be interpolated, and either of the intra-field interpolation method and the inter-field interpolation method is selected according to the detected motion value. Although the motion adaptive interpolation method can obtain an excellent vertical resolution with respect to the moving image and the still image compared with other methods, an interpolation function for various types of images is degraded. Particularly, a partial flicker occurs seriously in an image having much noise. In case most of the images are the moving images and some of them are the still images, noise occurs at a boundary area between the moving image and the still image due to noise occurring in the extraction of the motion value. Since the motion values are generated among odd fields and among even field, it is impossible to extract a motion in a very fast image, thus occurring a horizontal moire pattern afterimage.

It is desirable not to use the above-described hardware because the conversion of the interlaced scanning image into the progressive scanning image results in the degradation of the picture quality. Although hardware is complicated, one method for solving the above problems is to detect the motion states of pixels disposed adjacent to the to-be-interpolated pixel and then select one of the intra-field interpolation method and the inter-field interpolation method according to the detected motion value. In this case, the inter-field interpolation method is performed with respect to the still object so as to maintain the vertical resolution, and the intra-field interpolation method is performed with respect to the moving object so as to prevent the horizontal moire pattern afterimage. Such a deinterlace method is called an improved motion adaptive deinterlace method. According to the improved motion adaptive deinterlace method, complexity and improvement in the picture quality are greatly changed according to the number of field memory devices used to detect the motion. Generally, the improved motion adaptive deinterlace method is implemented with a history in order to make it possible to provide 32 fields by using two or three field memory devices.

SUMMARY OF THE INVENTION

An object of the present invention is to provide a motion adaptive deinterlace method and several techniques for improving a picture quality much more compared with a conventional method.

The present invention proposes ten techniques as follows.

First, when an intra-field interpolation is performed with respect to motion pixels, several nonlinear filter techniques are applied in order to stably search the direction of the boundary, in which angles of directions interpolated according to adjacent boundaries are changed, not by performing an interpolation simply by calculating average values of upper and lower pixels.

Second, it is possible to skillfully detect portions of very fast motion that disappears after an instant appearance at only one field, thereby preventing a horizontal moire pattern afterimage due to the incorrect motion detection.

Third, it is possible to display clear images just like the photograph by extracting the still image when the entire fields are the still image during several fields and by performing the inter-field interpolation even when noise exists.

Fourth, noises occurring when an interpolation is performed at portions having many motions and still boundary portions can be removed through the inter-field interpolation.

Fifth, noises occurring between the fields can be extracted and removed.

Sixth, an occurrence of horizontal moire patterns can be prevented by extracting an image having less motion.

Seventh, since the history of motion values is used, an interpolation can be performed by checking information on several fields using the small number of storage devices.

Eight, in case original images are film images, the best deinterlace is achieved by attaching fields corresponding to the same frames in the original images. The present invention proposes a technique that can determine whether or not that the original images are the film image using image itself inputted without any external information. In addition, the present invention proposes a technique that can attach fields existing within the same frames without confusing them with other frames.

Ninth, the image is restored closely to the original image with respect to the film mode image and the bad edit film image is extracted, thereby preventing the step pattern phenomenon occurring in the incorrectly extracted film image.

Tenth, the horizontal moire patterns that occur when the still caption appears or disappears can be prevented by setting the caption area. Further, the step pattern phenomenon occurring at the motion caption can be prevented, thereby improving the picture quality.

Conventional techniques similar to the first technique are disclosed in U.S. Pat. Nos. 5,929,918 and 6,262,773. In the U.S. Pat. No. 5,929,918, when the intra-field interpolation is performed since the motion is detected, the interpolation is performed using one line memory device and along three interpolation angles, i.e., a vertical direction, +45° and −45°. In U.S. Pat. No. 6,262,773, although the interpolation is performed along the boundaries of 11 directions, three line memory devices are used. According to the two patents, in case a large number of line memory devices are used, a circuit design is complicated, but the picture quality is improved since the interpolation can be performed along the boundaries of many directions. In case a small number of line memory devices are used, the hardware is simple but the picture quality is degraded since the direction that can be interpolated is reduced.

The present invention uses three line memory devices and performs the interpolation with respect to directions of 15 boundaries. At this time, it is important that the boundaries of 15 directions can be searched with a low possibility of an error occurrence.

The second to sixth techniques can clearly display the images by preventing noises, degradation of picture quality, moire pattern afterimage and block occurrence, which occur due to the incorrect interpolation in several situations.

The seventh technique makes it possible to use the information on several fields in the storage device, so that the second to sixth techniques can be implemented.

In next digital television era, high-quality movie films are expected to be broadcast in 1920×1080i format that is one of HDTV interlaced scanning formats. In that case, if a reception unit perfectly replays images in the progressive scanning images identical to the original images, a deeper impression can be made.

The ninth technique can perform the interpolation closely to the original image by extracting the bad edit occurring in an edition of a movie film.

The tenth technique can solve a problem that occurs when the caption is created in a digital video disk (DVD) or VCR, thereby preventing the degradation of picture quality that occurs due to the caption area.

In accordance with one aspect of the present invention, there is provided a method for deinterlacing an image signal, comprising the steps of: extracting a first motion value by using data of fields disposed before one field and three fields from a current field with respect to each pixel to be interpolated, a second motion value by using data of fields disposed before two and four fields from the current field, and a third motion value by using a data of the current field or data of fields disposed before four fields, one field and two fields from the current field, respectively; extracting motion values by using the data of the current field and the before-one-field data, and accumulating the extracted motion values to extract a first motion degree value; extracting a fourth motion value by using the before-one-field data and the before-two-field data, and accumulating the extracted fourth motion value to extract a second motion degree value; extracting a face area and searching an edge directionality of pixel by using pixels of a current line disposed within the field disposed before the two fields from the current field and by using pixels of lines disposed before one line, two line and three lines from the current line, and calculating an intra-field to-be-interpolated pixel value; determining whether or not the current field is a fast motion image by using the first motion value, the face area and a history value, the history value being calculated using the first and the second motion values; extracting a motion boundary maintenance image by using the first and third motion values and the history values, and a noise image between two adjacent fields by using the first motion value and the history value, respectively; sequentially accumulating/counting the first motion value and the second motion degree value, and determines whether or not the current field is a still image field; sequentially accumulating the first motion value and the first and second motion degree values during several fields, and determining whether or not the current field is a film image by using the accumulated value; if the current field is the film image, extracting a bad edit image and still and motion captions in a caption area by using the first motion degree value; performing an interpolation by using the intra-field to-be-interpolated pixel value, if the current field is not the film image, if the current field is the bad edit in the film image, if the current field is the still or motion caption in the caption area, and if the current field is the fast motion image; calculating an interpolation pixel value by performing the inter-field interpolation, if the current field meets the conditions of the step (j) and is the still image, if it is determined that there is no pixel motion according to the second motion value, if the current field is not a pixel contained in the fast motion image, if the current field is determined as a pixel contained in the motion boundary maintenance image, and if the current field is determined as a pixel contained in the inter-field noise image; and if the current field is determined as the still image and if the second motion value of each pixel is small, comparing the intra-field pixel value with the inter-field pixel value, and if the resulting value is less than a predefined reference value, determining the current field as an image having a small motion, and performing an interpolation by using the intra-field to-be-interpolated pixel value.

Preferably, the extraction of the face area includes the steps of: calculating a first difference value of horizontal pixels in the lines disposed before one line and two lines within the field disposed before two fields; calculating a second difference value of pixels disposed in a horizontal direction in the lines disposed before one line and two lines; calculating a third difference value of vertical pixels, right/left 45° pixels and right/left 26° pixels in the current line and the line disposed before one line; calculating a fourth difference value of vertical pixels right/left 45° pixels and right/left 26° pixels in the lines disposed before two lines and three lines; calculating a fifth difference value of vertical pixels right/left 45° pixels and right/left 26° pixels in the lines disposed before one line and two lines; and extracting the face area, if the first and second difference values are less than a predefined reference value or if the third to fifth difference values are less than the predefined reference value.

Preferably, the extraction of the history value includes the steps of: if minimum values of the first and second motion values are more than a reference value, determining that the motion exists and subtracting a predefined value; if the minimum values of the first and second motion values are less than the reference value, determining that no motion exists and adding a predetermined value; and assigning "0" if the subtracted value is less than "0", assigning the number of fields if the subtracted value exceeds the number of fields defined for calculation, and extracting the subtracted value in the other cases.

Preferably, the current field is extracted as the fast motion image if the first motion value is more than a predefined reference value, and the to-be-interpolated field is extracted as the fast motion image if the history value is less than a predefined reference value and the face area is extracted.

Preferably, the extraction of the fourth motion value includes the steps of: calculating an absolute value of a difference between a pixel disposed vertically above the to-be-interpolated pixel of the field disposed before two fields and pixels disposed at the same position as the to-be-interpolated pixel of the field disposed before two fields in a field disposed before one field from the current field; and calculating an absolute value of a difference between a pixel disposed vertically below the to-be-interpolated pixel of the field disposed before two fields and pixels disposed at the same position in the field disposed before one field.

Preferably, the to-be-interpolated pixel is extracted as the motion boundary maintenance image if a minimum value of the second motion value, the first motion value and the fourth motion value are less than a predefined reference value and the history value is more than the reference value.

Preferably, the to-be-interpolated pixel is extracted as the inter-field noise image if a minimum value of the second motion value and the history value are less than a predefined reference value and the first motion value is more than a predefined reference value.

In accordance with another aspect of the present invention, an apparatus for deinterlacing an image signal comprises: an intra-field pixel processing means for detecting a face area and a to-be-interpolated data within a field by using pixels of a current line disposed within a field disposed before two fields from a current field and by pixels of lines disposed before one line, two line and three lines with respect to the current line; a motion value generating means for detecting first to third motion values and first and second motion degree values by using a before-one-field data and a before-three-field data of the current field, a before-two-field data and a before-four-field data of the current field, the current field or the before-four-field data, the before-one-field data and the before-two-field data of the current field; a history control means for detecting a history value by using the first and second motion values obtained at the motion value generating means, the history value using information on several fields; a fast image processing means for detecting a fast motion image by using the first motion value, the face area and the history value; a film image processing means for detecting a film image and a caption area according to the first and second motion degree values, the first motion value and an external caption vertical/horizontal position signal and determining a to-be-interpolated field data according to the detected film image and caption area; a still image processing means for accumulating/counting the first motion value and the second motion degree value to detect a still image; an inter-field noise image processing means for detecting an adjacent inter-field noise image by using the first motion value and the history value; a motion boundary maintenance image processing means for detecting a motion boundary maintenance image by using the first and third motion values and the history value; and a synthesizing means for selectively interpolating the intra-field to-be-interpolated data, the before-one-field inter-field data and the before-three-field inter-field data according to the second motion value, the fast motion image, the still image, the inter-field noise image, the motion boundary maintenance image, the film image and the caption image.

When the interlaced scanning image is converted into the progressive scanning image, the present invention automatically detects the boundary portions of the several angles in the image signal and interpolates the lines along the boundary portions. Further, the present invention automatically detects and interpolates the film image, the still image, the caption image and the fast motion image.

The present invention can solve the problems of step pattern phenomenon caused in the boundary portions when the interlaced scanning image is converted into the progressive scanning image, so that the boundary portions are connected in a form of a smooth straight line. In addition, the present invention can solve the problem of the horizontal moire patterning afterimage in the partial image having the fast motion and the image having the small motion. Further, the present invention can improve the picture quality by restoring the film mode image in a resolution close to the original image.

Further, the present invention can display the image in a resolution close to the photograph by removing the noise occurring in the still image and the partial image being still during several fields in the images having many motions, and can prevent the step pattern phenomenon occurring in the incorrectly extracted film image and the horizontal moire patterns occurring when the still caption appears or disappears, thereby improving the picture quality.

Additionally advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, an apparatus and method for deinterlacing video signals in accordance with the present invention will be described in detail with reference to the accompanying drawings.

Figure 1:
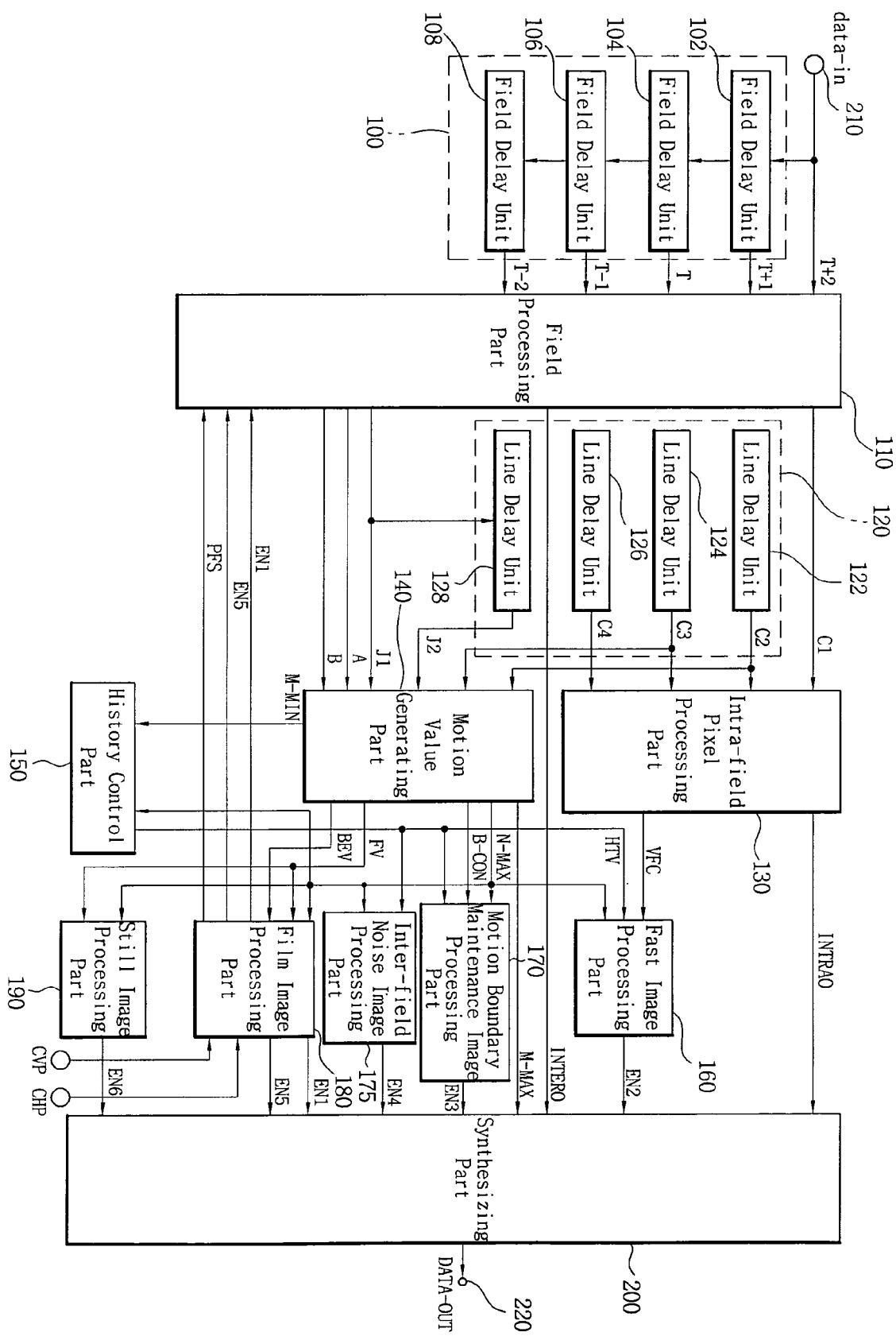
FIG. 1 is a block diagram showing an overall construction of an apparatus for deinterlacing video signals in accordance with the present invention.

FIG. 1 is a block diagram showing an overall construction of an apparatus for deinterlacing video signals in accordance with the present invention.

According to the apparatus of the present invention, a current-field image data T+2 is inputted through an input terminal 210 and a sequential field delay part 100 stores the current-field image data T+2 into first to fourth field delay units 102, 104, 106 and 108 by field unit and sequentially outputs the stored field image data.

A field processing part 110 processes the current-field image data T+2, a one-field delayed image data T+1, a two-field delayed image data T, a three-field delayed image data T−1 and a four-field delayed image data T−2 in response to an external caption display mode signal EN5, a film mode signal EN1 and an inter-field interpolating select signal PFS by pixel unit, and then generates pixel-delayed line image data C1, A, B and J1 and a to-be-interpolated inter-field data INTER0.

A sequential line processing part 120 stores the current line image data C1 into first to third line delay units 122, 124 and 126 by line unit and then outputs it, in which the current line image data C1 is within the field (T) disposed before two fields with respect to the current-field image data T+2 inputted from the field processing part 110. Further, the sequential line processing part 120 stores the line image data J1 into a fourth line delay unit 128 by line unit and then outputs it.

An intra-field pixel processing part 130 searches boundary portions of various angles by using the current line image data C1 inputted from the field processing part 110 and line image data C2 to C4 delayed by the first to third line delay units 122 to 126, outputs the to-be-interpolated intra-field data INTRA0 according to directionality of the boundary portions, and outputs a data VFC indicating a face area in order to determine a fast motion image.

A motion value generating part 140 generates a motion value N-MAX, a minimum motion value M-MIN, a maximum motion value M-MAX, a motion boundary maintenance condition signal B-CON and motion degree values FV and BEV by using the line image data C2, C3 and J4 that are line-delayed by the line delay units 122, 124 and 128 and the line image data A, B and J1 that are inputted from the field processing part 110.

A history control part 150 generates a history value HTV, which can use information on several fields, by using the minimum motion value M-MIN and the motion value N-MAX.

A fast image processing part 160 detects a fast motion image by using the motion value N-MAX, the data VFC, and the history value HTV.

A motion boundary maintenance image processing part 170 detects a motion boundary maintenance signal EN3 by using the motion value N-MAX, the motion boundary maintenance condition signal B-CON and the history value HTV.

An inter-field noise image processing part 175 detects an adjacent inter-field noise signal EN4 by using the motion value N-MAX and the history value HTV.

A film image processing part 180 detects a film image and a caption area by using the motion value N-MAX, the motion degree values FV and BEV and caption vertical/horizontal position signals CVP and CHP, and outputs the caption display mode signal EN5, the film mode signal EN1 and the inter-field interpolating select signal PFS.

A still image processing part 190 accumulates/counts the motion value N-MAX and the motion degree value FV to detect a still image signal EN6.

A synthesizing part 200 selectively interpolates the intra-field data INTRA0 and the inter-field data INTER0 according to the maximum motion value M-MAX, the fast image motion signal EN2, the motion boundary maintenance signal EN3, the inter-field noise signal EN4, the caption display mode signal EN5, the film mode signal EN1 and the still image signal EN6.

Figure 2:
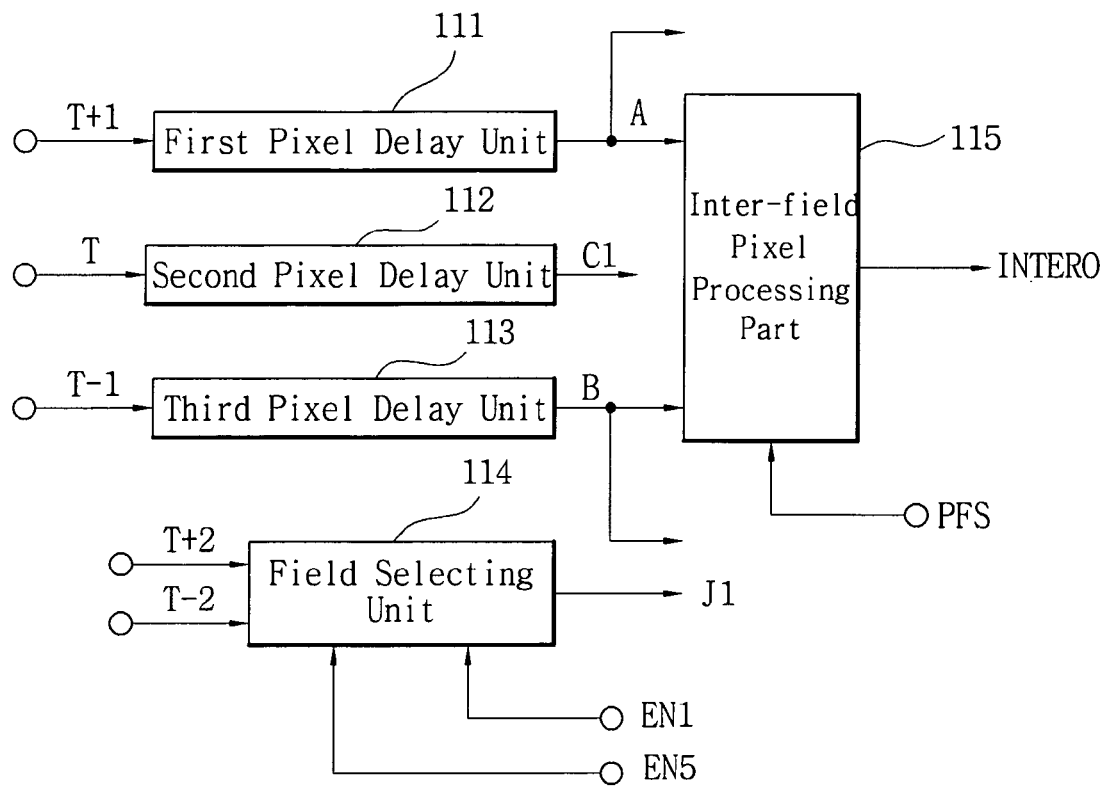
FIG. 2 is a detailed block diagram of the field processing part shown in FIG. 1.

FIG. 2 is a detailed block diagram of the field processing part 110 shown in FIG. 1.

Referring to FIG. 2, the field processing part 110 includes first to third pixel delay units 111 to 113, a field selecting unit 114, and an inter-field pixel processing unit 115. The first to third pixel delay units 111 to 113 receives the delayed image data T+1, T and T−1 from the first to third delay units 102 to 106 and delays them by pixel unit to generate the line image data A, C1 and B, respectively. The field selecting unit 114 selects the current-field image data T+2 and the four-field delayed image data T−2 according to the caption display mode signal EN5 and the film mode signal EN1 and delays the selected field image data by pixel unit to output the line image data J1. The inter-field pixel processing unit 115 selects the pixel-delayed line image data A and the pixel-delayed line image data B according to the inter-field interpolating select signal PFS to output the inter-field data INTER0.

Figure 3:
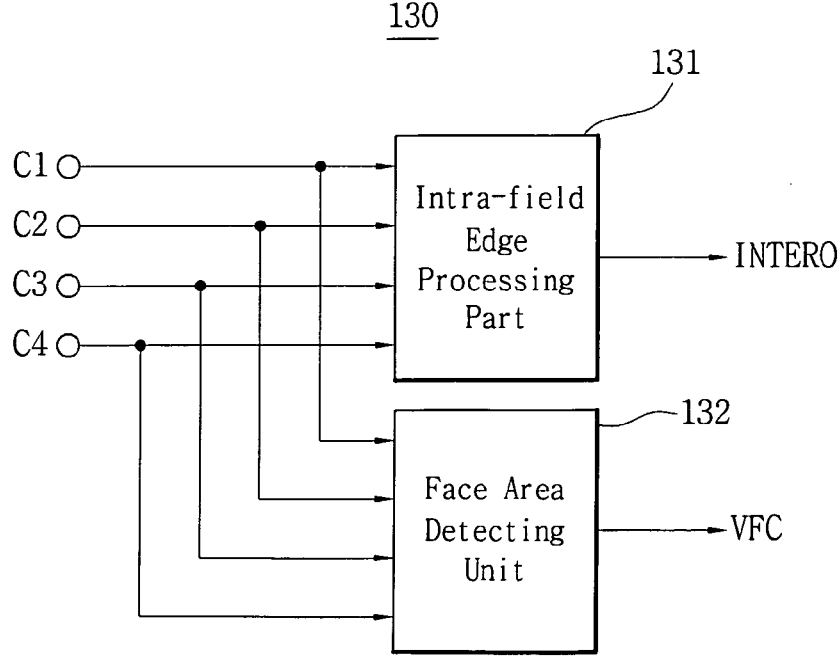
FIG. 3 is a detailed block diagram of the intra-field pixel processing part shown in FIG. 1.

FIG. 3 is a detailed block diagram of the intra-field pixel processing part 130 shown in FIG. 1.

Referring to FIG. 3, the intra-field pixel processing part 130 includes an intra-field edge processing unit 131 and a face area detecting unit 132. The intra-field edge processing unit 131 searches edge directionality of to-be-interpolated pixel surroundings by using the line image data C1 to C4 outputted from the second pixel delay unit 112 and the first to third line delay units 122 to 126, and detects data to be interpolated according to the directionality within the field to output the intra-field data INTRA0. The face area detecting unit 132 receives the line image data C1 to C4, compares a predefined reference value with a difference value of pixels having a predetermined slope among the directionalities of several angles by using the upper and lower pixels, and detects a face area to output the data VFC indicating that it is the face area.

Figure 4:
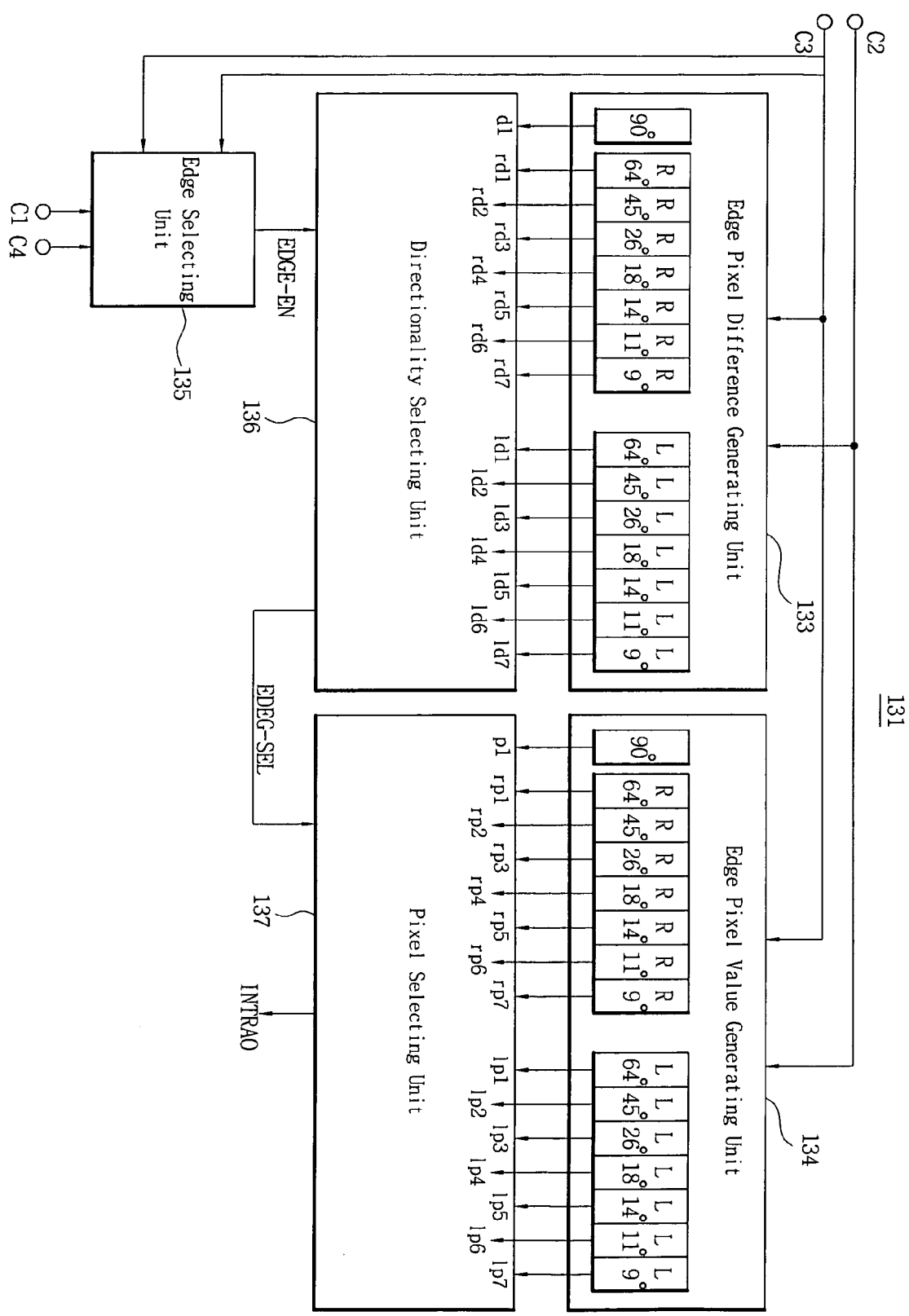
FIG. 4 is a detailed block diagram of the intra-field edge processing unit shown in FIG. 3.

FIG. 4 is a detailed block diagram of the intra-field edge processing unit 131 shown in FIG. 3.

Referring to FIG. 4, the intra-field edge processing unit 131 includes an edge pixel difference generating unit 133, an edge pixel value generating unit 134, an edge selecting unit 135, a directionality selecting unit 136, and a pixel selecting unit 137. The edge pixel difference generating unit 133 outputs the difference values d1, rd1 to rd7 and ld1 to ld7 with respect to the edge directionalities of several angles by using the line image data C2 and C3. The edge pixel value generating unit 134 calculates and outputs pixel average values p1, rp1 to rp7 and lp1 to lp7 with respect to the edge directionalities of several angles by using the line image data C2 and C3. The edge selecting unit 135 calculates varied values of pixels with respect to the directionalities of several angels by using the current line image data C1 and the delayed line image data C2 to C4, compares the varied values with a reference value to detect whether or not an edge exists, and outputs an edge existence signal EDGE-EN according to the detection result. The directionality selecting unit 136 obtains a directionality of a to-be-finally-interpolated edge according to the edge existence signal EDGE-EN by using the difference values d1, rd1 to rd7 and ld1 to ld7, and outputs an edge direction select signal EDGE-SEL. The pixel selecting unit 137 selects one of the average values p1, rp1 to rp7 and lp1 to lp7 according to the edge direction select signal EDGE-SEL and output the selected average value as the to-be-interpolated intra-field data INTRA0.

Figure 5:
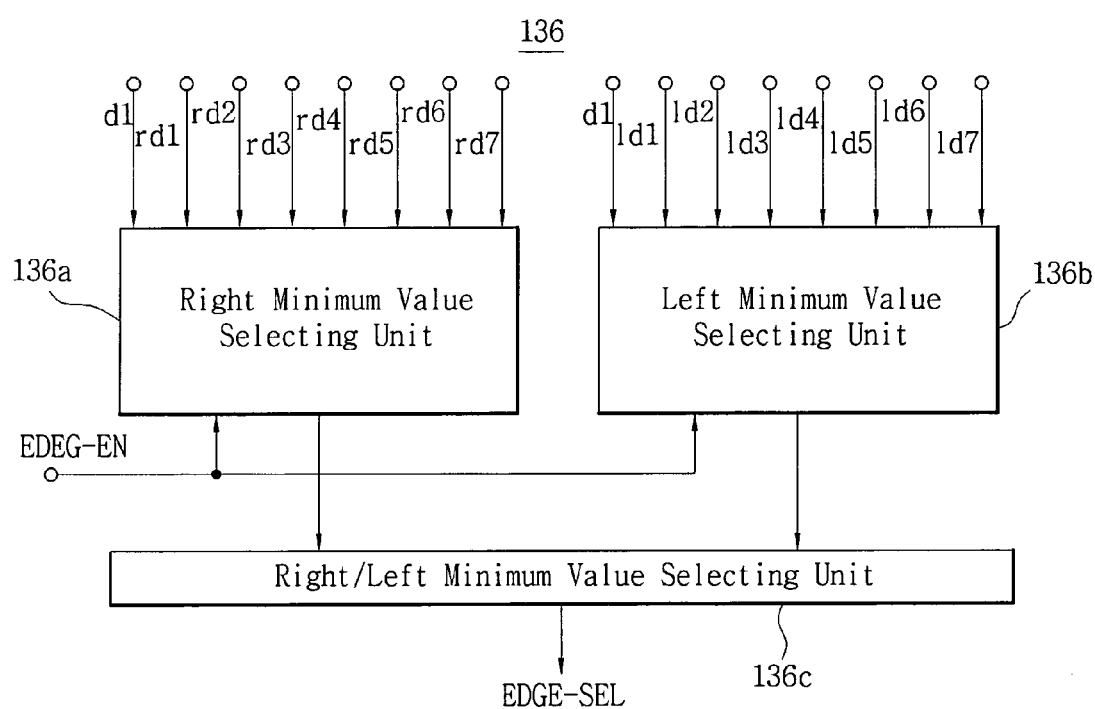
FIG. 5 is a detailed block diagram of the directionality selecting unit shown in FIG. 4.

FIG. 5 is a detailed block diagram of the directionality selecting unit 136 shown in FIG. 4.

Referring to FIG. 5, the directionality selecting unit 136 includes a right minimum value selecting unit 136a, a left minimum value selecting unit 136b and a right/left minimum value selecting unit 136c. The right minimum value selecting unit 136a receives the difference values d1, rd1 to rd7 with respect to the directionalities of right edges among the difference values d1, rd1 to rd7 and ld1 to ld7 with respect to the directionalities of several angles which have a possibility of being interpolated, and selects and outputs a minimum value among the difference values of angles whose edge existence signal EDGE-EN of the edge selecting unit is "1". The left minimum value selecting unit 136b receives the difference values d1, ld1 to ld7 with respect to the directionalities of left edges among the difference values d1, rd1 to rd7 and ld1 to ld7 with respect to the directionalities of several angles which have a possibility of being interpolated, and selects and outputs a minimum value among the difference values of angles whose edge existence signal EDGE-EN of the edge selecting unit is "1". The right/left minimum value selecting unit 136c selects one of the right direction minimum value and the left direction minimum value which are respectively inputted from the right minimum value selecting unit 136a and the left minimum value selecting unit 136b, determines a directionality of a corresponding edge as a final edge directionality, and outputs the edge direction select signal EDGE-SEL.

Figure 6:
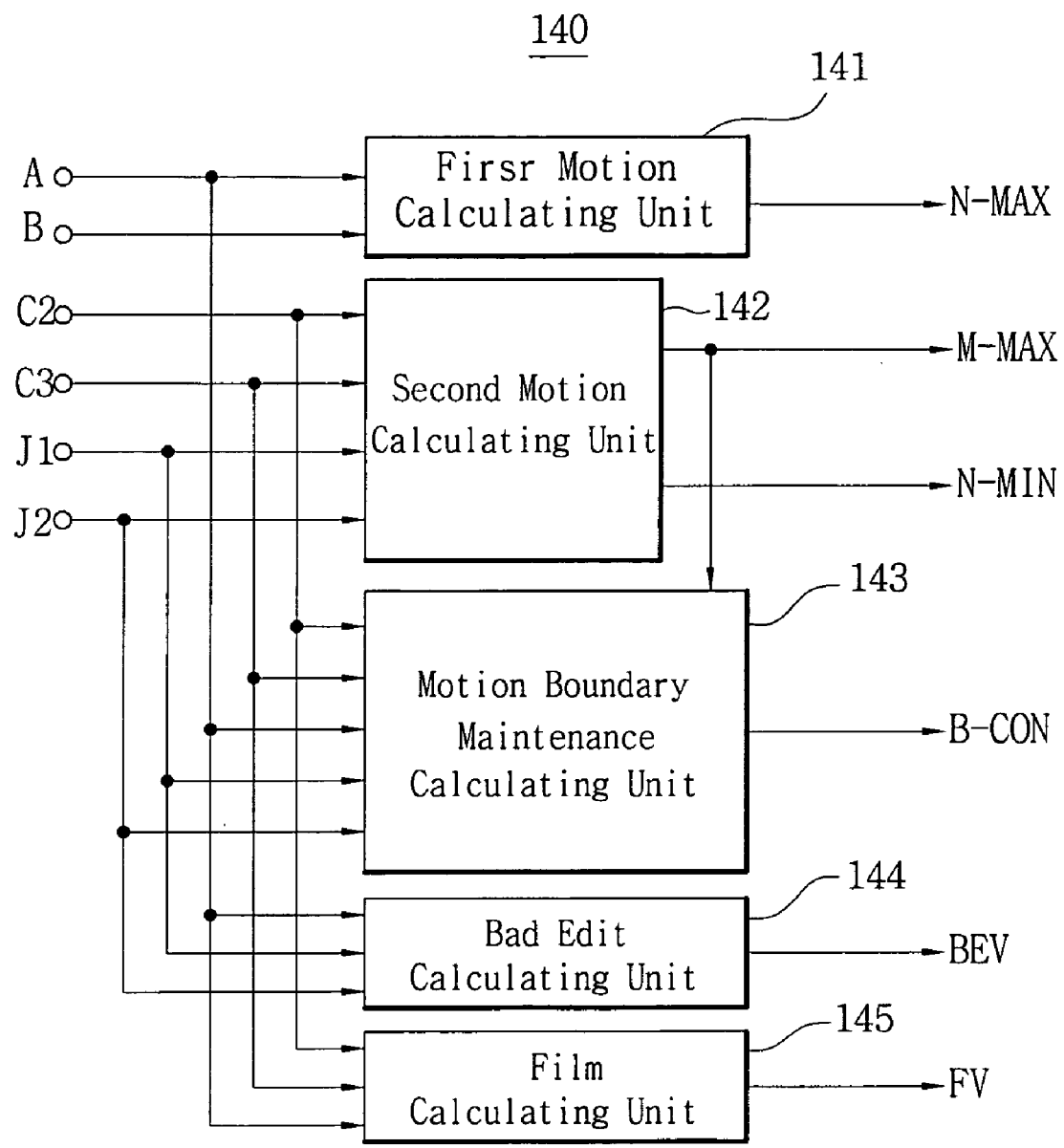
FIG. 6 is a detailed block diagram of the motion value generating part shown in FIG. 1.

FIG. 6 is a detailed block diagram of the motion value generating part 140 shown in FIG. 1.

Referring to FIG. 6, the motion value generating part 140 includes a first motion calculating unit 141, a second motion calculating unit 142, a motion boundary maintenance calculating unit 143, a bad edit calculating unit 144, and a film calculating unit 145. The first motion calculating unit 141 detects the motion value N-MAX by calculating an absolute value of a difference between pixels disposed at the same position in the pixel-delayed line image data A and B outputted from the first and third pixel delay units 111 and 113 of FIG. 2. The second motion calculating unit 142 detects the minimum motion value M-MIN and the maximum motion value M-MAX by calculating an absolute value of a difference between pixels disposed at the same position in the line image data C2, C3 and J2 and the line image data J1, which are respectively outputted from the line delay units 122, 124 and 128 of FIG. 1 and the field selecting unit 114 of FIG. 2. The motion boundary maintenance calculating unit 143 detects the motion boundary maintenance condition signal B-CON by calculating an absolute value of a difference between pixels disposed at the same position with respect to vertically upper and lower pixels of a pixel to be interpolated using the line image data A, C2, C3, J1 and J2 and the maximum motion value M-MAX. The bad edit calculating unit 144 detects the motion degree value BEV used for a bad edit image detection by accumulating the current-field or before-four-field line image data J1 inputted from the field selecting unit 114, the line image data J2 inputted from the fourth line delay unit 128, and the before-one-field line image data A. The film calculating unit 145 detects the motion degree value FV used for 2:2 film image detection by accumulating the before-one-field line image data A and the before-two-field line image data C2 and C3.

Figure 7:
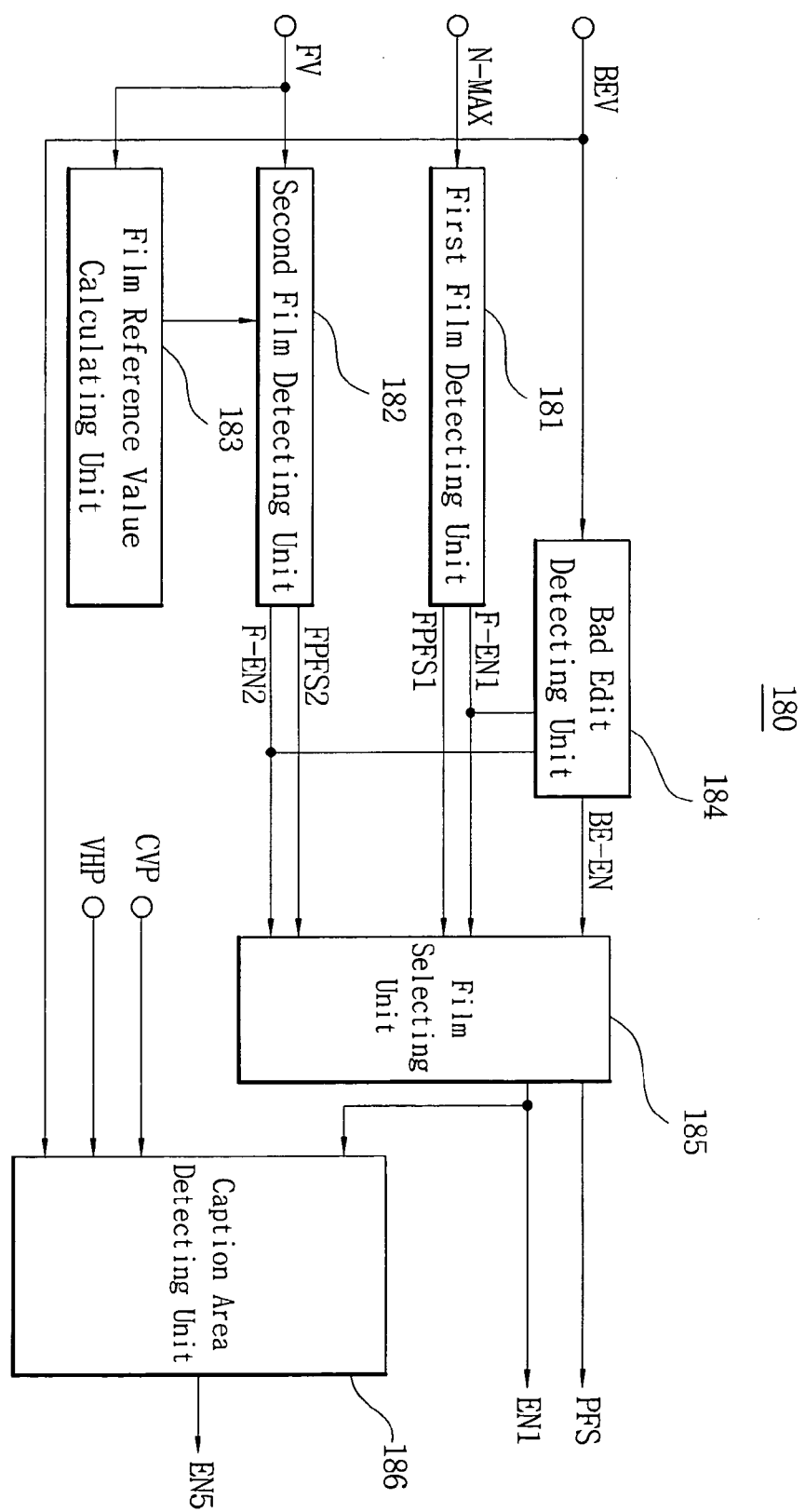
FIG. 7 is a detailed block diagram of the film image processing part shown in FIG. 1.

FIG. 7 is a detailed block diagram of the film image processing part 180 shown in FIG. 1.

Referring to FIG. 7, the film image processing part 180 includes a first film detecting unit 181, a second film detecting unit 182, a film reference value calculating unit 183, a bad edit detecting unit 184, a film selecting unit 185, and a caption area detecting unit 186. The first film detecting unit 181 accumulates the respective pixels' motion values N-MAX outputted from the motion value generating part 140 during several fields in sequence, compares the accumulated motion value with the reference value to detect whether or not the current input image is 3:2 film image, and outputs a first film image recognition signal F-EN1 and a first field interpolation select signal FPFS1. The film reference value calculating unit 183 accumulates the motion degree values FV detected by the motion value generating part 140, and compares the accumulated motion degree value with the reference value to calculate 2:2 film adaptive reference value. The second film detecting unit 182 accumulates the motion degree values FV outputted from the motion value generating part 140 during several fields in sequence, compares the accumulated motion degree value with the 2:2 film adaptive reference value to detect whether or not the current input image is 2:2 film image, and outputs a second film image recognition signal F-EN2 and a second field interpolation select signal FPFS2. The bad edit detecting unit 184 detects a bad edit image from 3:2 or 2:2 film image according to the first and second film image recognition signals F-EN1 and F-EN2 by using the motion degree value BEV inputted from the motion value generating part 140, and outputs a film bad edit recognition signal BE-EN. The film selecting unit 185 selects one to-be-interpolated film image mode among the first and second film image recognition signals F-EN1 and F-EN2 and the first and second field interpolation select signals FPFS1 and FPFS2 according to the film bad edit recognition signal BE-EN, and outputs the film mode signal EN1 and the inter-field interpolating select signal PFS. The caption area detecting unit 186 defines the caption area according to the selected film mode signal EN1 by using the previously set caption vertical/horizontal position signals CVP and CHP and the motion degree value BEV, detects the still caption image and the motion caption image in the caption area, and outputs the caption display mode signal EN5.

Figure 8:
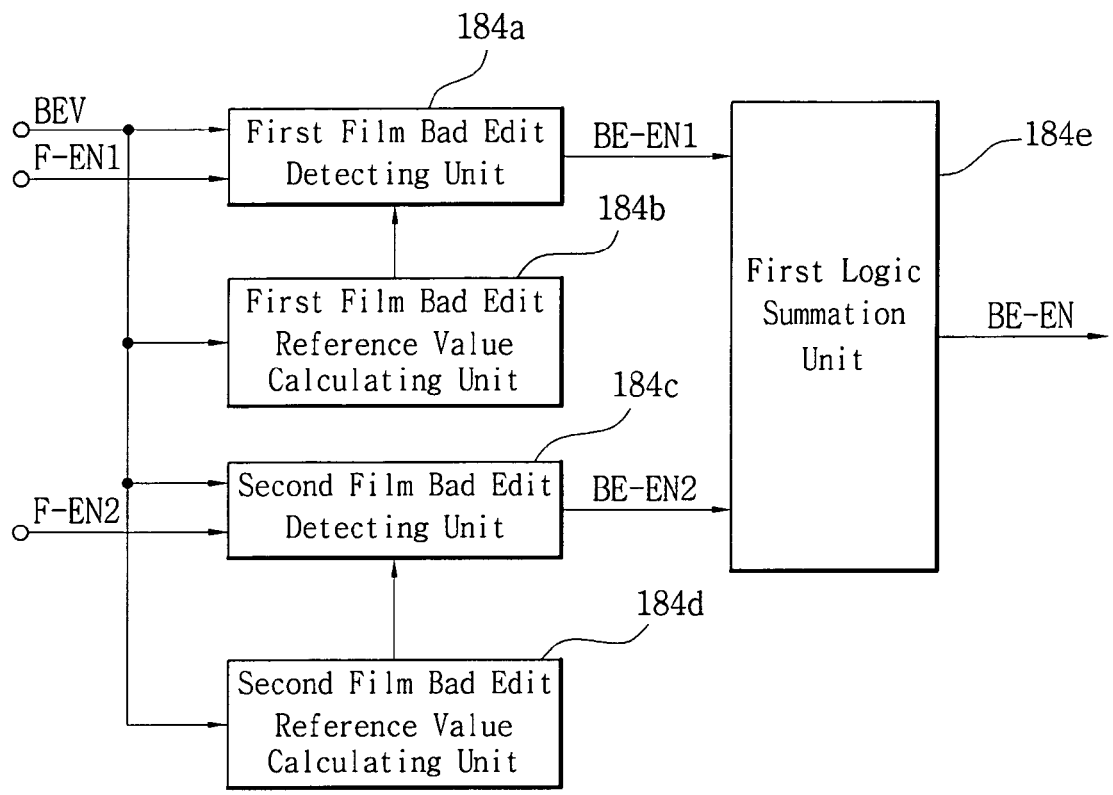
FIG. 8 is a detailed block diagram of the bad edit detecting unit shown in FIG. 7.

FIG. 8 is a detailed block diagram of the bad edit detecting unit 184 shown in FIG. 7.

Referring to FIG. 8, the bad edit detecting unit 184 includes first and second film bad edit reference value calculating units 184b and 184d, first and second film bad edit detecting units 184a and 184c, and a first logic summation unit 184e. The first and second film bad edit reference value calculating units 184b and 184d accumulate the motion degree value BEV during arbitrary fields, calculates the remaining values except a maximum value and a minimum value among the motion degree values of the accumulated arbitrary fields, and generates a 3:2 bad edit detection adaptive reference value and a 2:2 bad edit detection adaptive reference value, respectively. The first film bad edit detecting unit 184a compares the 3:2 bad edit detection adaptive reference value with the motion degree value BEV according to the 3:2 film image recognition signal F-EN1 that is inputted from the first film detecting unit 181 and indicates the 3:2 film image, and outputs a bad edit recognition signal BE-EN1 indicating that a next field is the bad edit image in the 3:2 film image. The second film bad edit detecting unit 184c compares the 2:2 bad edit detection adaptive reference value with the motion degree value BEV according to the 2:2 film image recognition signal F-EN2 inputted from the second film detecting unit 182 and indicating the 2:2 film image, and outputs a bad edit recognition signal BE-EN2 indicating that a next field is the bad edit image in the 2:2 film image. The first logic summation unit 184e performs a logic summation of the 3:2 and 2:2 bad edit recognition signals BE-EN1 and BE-EN2 detected by the first and second film bad edit detecting units 184a and 184c, and outputs the film bad edit recognition signal BE-EN.

Figure 9:
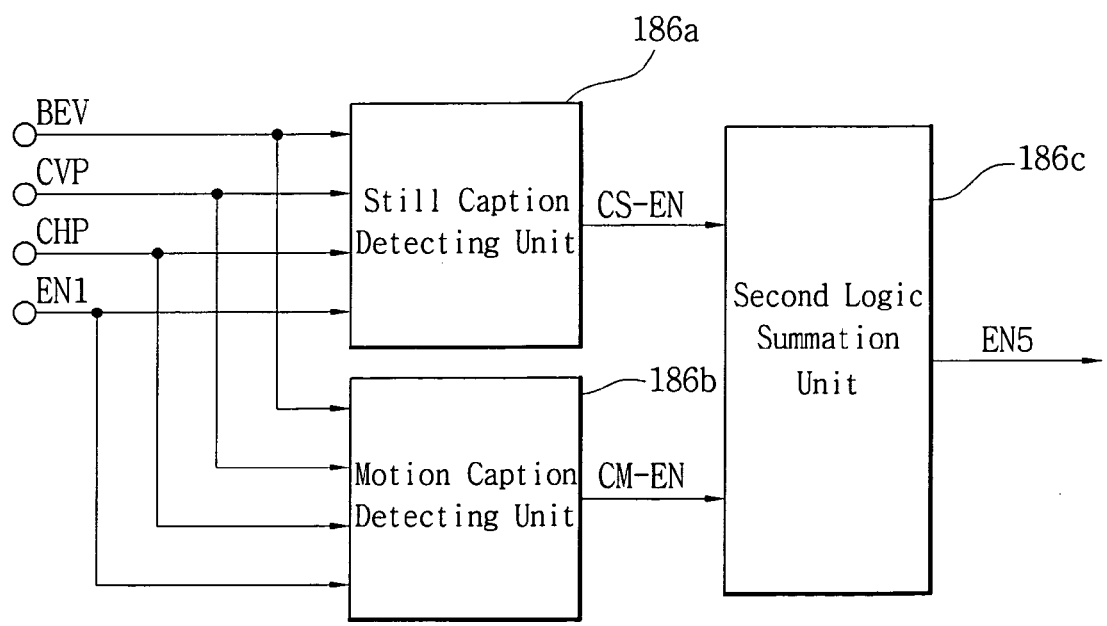
FIG. 9 is a detailed block diagram of the caption area detecting unit shown in FIG. 7.

FIG. 9 is a detailed block diagram of the caption area detecting unit 186 shown in FIG. 7.

Referring to FIG. 9, the caption area detecting unit 186 includes a still caption detecting unit 186a, a motion caption detecting unit 186b, and a second logic summation unit 186c. The still caption detecting unit 186a and the motion caption detecting unit 186b accumulate the motion degree values BEV of the bad edit, which are calculated by the bad edit calculating unit 144 of the motion value generating part 140, during arbitrary fields according to the film mode signal EN1 and the caption vertical/horizontal position signals CVP and CHP, compares the accumulated value with the motion value obtained at the caption area, and outputs a still caption recognition signal CS-EN and a motion caption recognition signal CM-EN indicating that a next field is the still caption and the motion caption, respectively. The second logic summation unit 186c performs a logic summation of the still caption recognition signal CS-EN and the motion caption recognition signal CM-EN to output the caption display mode signal EN5.

Hereinafter, a preferred embodiment of the present invention will be described in detail with reference to FIGS. 1 to 13.

As shown in FIG. 1, first, if the image data data-in is inputted through the input terminal 210, the first to fourth field delay units 102 to 108 of the sequential field delay part 100 store the inputted current-field image data T+2 by field unit and generates the stored image data to the field processing part 110. The field processing part 110 processes the current-field image data T+2, the one-field delayed image data T+1, the two-field delayed image data T, the three-field delayed image data T−1 and the four-field delayed image data T−2 according to the caption display mode signal EN5, the film mode signal EN1 and the inter-field interpolating select signal PFS by pixel unit, and then generates the line image data C1, A, B and J1 and the to-be-interpolated inter-field data INTER0.

As shown in FIG. 2, the field processing part 110 includes the first to third pixel delay units 111 to 113, the field selecting unit 114 and the inter-field pixel processing unit 115.

The first to third pixel delay units 111 to 113 store the field image data T+1, T and T+1 by pixel unit and outputs the line image data A, C1 and B, respectively. Only when the film mode signal EN1 inputted from the film image processing part 180 is "1" and the caption display mode signal EN5 is "0", the field selecting unit 114 selects and delays the current-field image data T+2 by pixel unit, and then outputs the line image data J1 as the delayed image data. In the other cases, the field selecting unit 114 delays the field image data T−2 by pixel unit and outputs the line image data J1 as the delayed field image data. In case the inter-field interpolating select signal PFS of the film image processing part 180 is "1", the inter-field pixel processing unit 115 outputs the inter-field data INTER0 as the line image data B. Here, the line image data B is a data that is pixel-delayed through the third pixel delay unit 113 of the field processing part 110. Meanwhile, in case the inter-field interpolating select signal is "0", the inter-field pixel processing unit 115 outputs the inter-field data INTER0 as the line image data A to the synthesizing part 200. Here, the line image data A is a data that is pixel-delayed through the first pixel delay unit 111 of the field processing part 110.

The sequential line processing part 120 delays the current line image data C1 through the first to third line delay units 122 to 126 in sequence and provides the resulting data to both the intra-field pixel processing part 130 and the motion value generating part 140. Here, the current line image data C1 is a data that is pixel-delayed through the second pixel delay unit 112 of the field processing part 110. Further, the pixel-delayed line image data J1 outputted from the field selecting unit 114 is delayed through the fourth line delay unit 128 and provided to the motion value generating part 140.

The intra-field processing part 130 searches boundary portions of various angles by using the current line image data C1 inputted from the field processing part 110 and line image data C2 to C4 inputted from the first to third line delay units 122 to 126, and outputs the intra-field data INTRA0 to be interpolated according to the directionality of the boundary portions. The intra-field data INTRA0 is provided to the synthesizing part 200. Further, the intra-processing part 130 detects and outputs the data VFC to the fast image processing part 160. Here, the data VFC is a data indicating the face area in order to determine the fast motion image.

As shown in FIG. 3, the intra-field pixel processing part 130 is provided with the intra-field edge processing unit 131 and the face area detecting unit 132.

The intra-field edge processing unit 131 searches the edge directionality of the to-be-interpolated pixel surroundings by using the line image data C1 to C4 outputted from the second pixel delay unit 112 and the first to third line delay units 122 to 126, detects data to be interpolated according to the directionality within the field, and outputs the intra-field data INTRA0 to the synthesizing part 200. The face area detecting unit 132 receives the line image data C1 to C4, compares the predefined reference value with the difference value of pixels having a predetermined slope among the directionalities of several angles by using the upper and lower pixels, and detects whether or not it is the face area. In case the pixel is the face area, the data VFC of "1" is outputted for determining whether or not the pixel is the fast motion image. In case it is not the face area, the data VFC of "0" is outputted to the fast image processing part 160 for determining whether or not the pixel is the fast motion image.

FIGS. 10A to 10F illustrate a concept of the face area in the face area detecting unit 132. As shown, if value differences of the pixels represented by arrows among the input line image data C1 to C4 are smaller than a predefined value, it is determined as the face area.

Figure 10A:
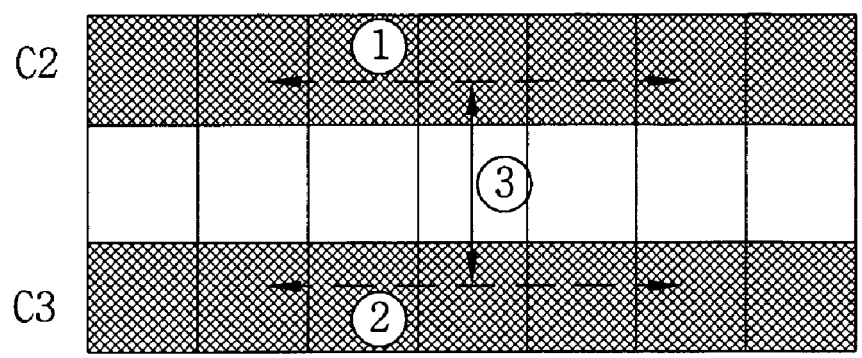
FIGS. 10A to 10F illustrate a concept of the face area in the face area detecting unit of FIG. 3.
Figure 10B:
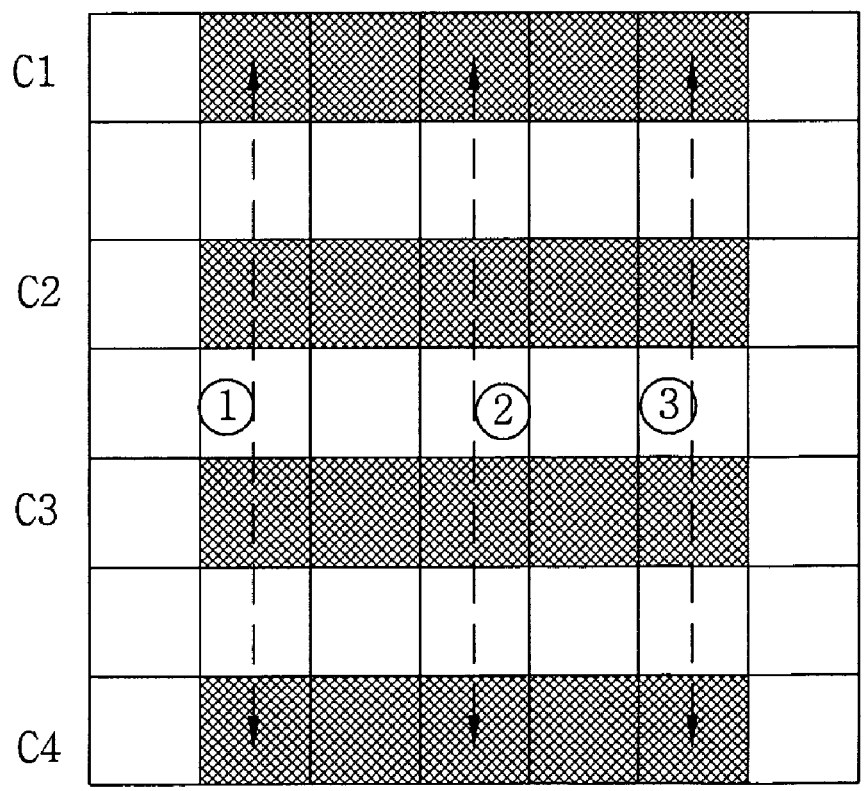

In other words, according to a method for detecting the face area in order to determine the fast motion image, a pixel difference value diff1 of a horizontal direction in the line image data C2 and C3 is calculated in a state that the line image data C1 to C4 are alternately stored in line memory devices, as shown in FIG. 10A. Then, a pixel difference value diff2 of a vertical direction in the line image data C2 and C3 is calculated, as shown in FIG. 10B.

Figure 10C:
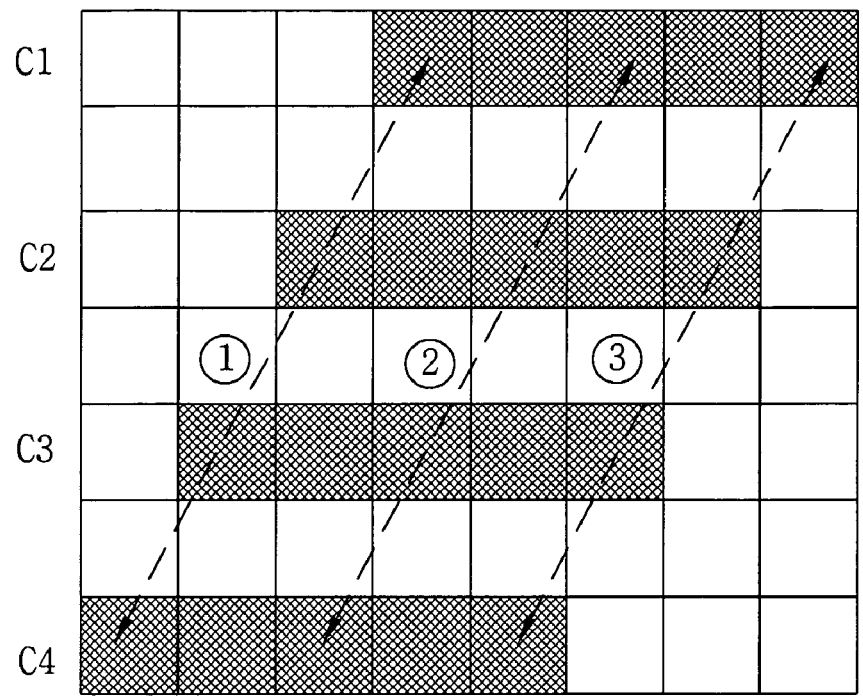
Figure 10D:
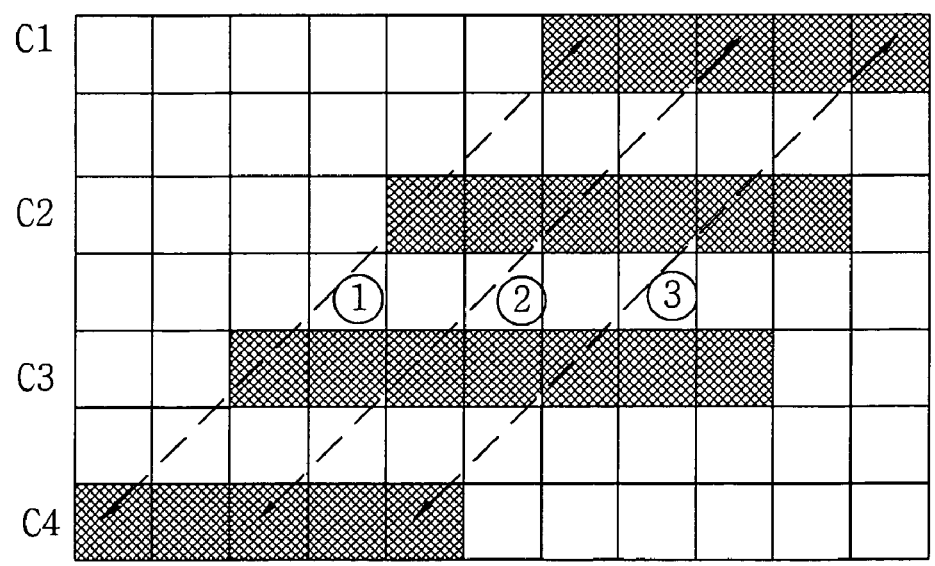
Figure 10E:
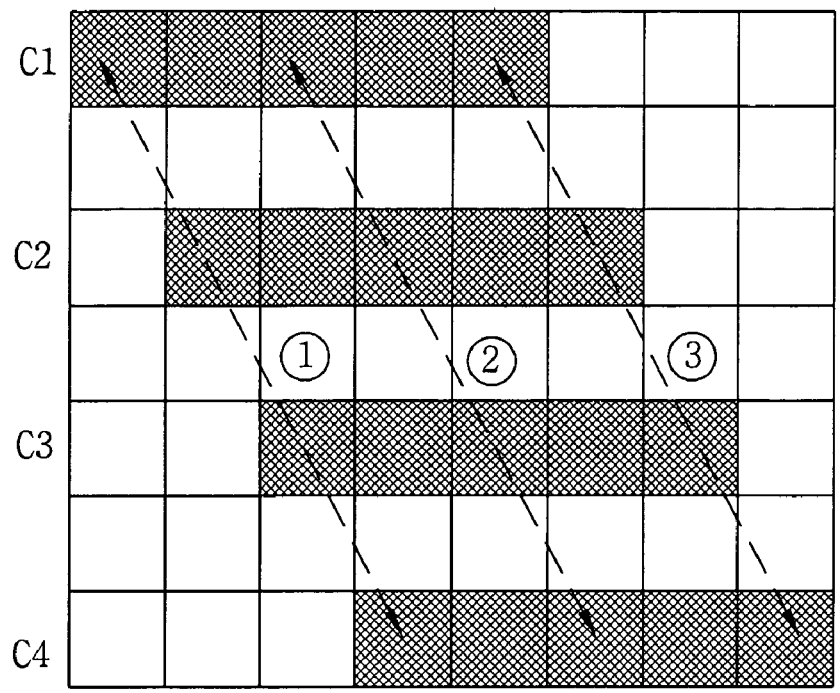
Figure 10F:
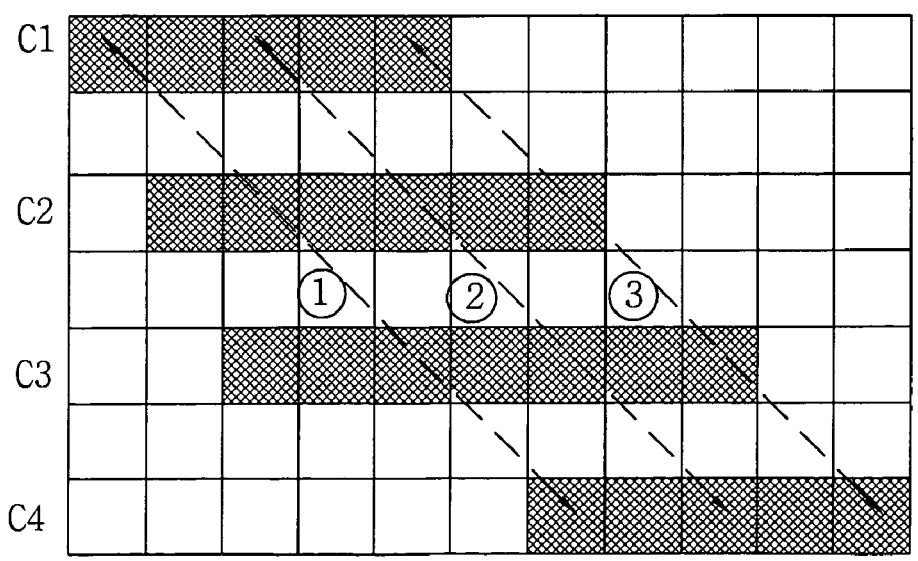

Further, difference values diff3 between vertical pixels of the current line image data C1 and the line image C2, between right/left 45° pixels thereof as shown in FIG. FIGS. 10C and 10E, and between right/left 26° pixels thereof as shown in FIGS. 10D and 10F are calculated.

Difference values diff4 between vertical pixels of the line image data C3 and C4, between right/left 45° pixels thereof and between right/left 26° pixels thereof are calculated.

Finally, difference values diff5 between vertical pixels of the line image data C2 and the line image C3, between right/left 45° pixels thereof and between right/left 26° pixels thereof are calculated.

The face area is determined by comparing the difference values diff1 to diff5 with the predefined reference value. At this point, if the difference value diff1 is smaller than the predefined reference value, or if the difference value diff2 is smaller than the predefined value, or if the difference values diff3 to diff5 of the same angle are smaller than the predefined reference value, it is determined as the face area and the data VFC of "1" indicating the face area is outputted.

Here, the face area can be detected using only the line image data C2 and C3.

As shown in FIG. 4, the intra-field edge processing unit 131 includes the edge pixel difference generating unit 133, the edge pixel value generating unit 134, the edge selecting unit 135, the directionality selecting unit 136, and the pixel selecting unit 137.

Using the line image data C2 and C3, the edge pixel difference generating unit 133 selects the edge directionalities of several angles, such as 90°, right/left 9°, right/left 11°, right/left 14°, right/left 18°, right/left 26°, right/left 45° and right/left 64°, and then calculates the difference values d1, rd1 to rd7 and ld1 to ld7 with respect to the edge directionalities of several angles. Here, the difference values d1, rd1 to rd7 and ld1 to ld7 with respect to the edge directionalities of several angles can be obtained as follows:

difference value ($d$) of pixel=$\{ABS(D-G)+2 \times ABS(E-H)+ABS(F-I)\}/2$ where, D, E and F are pixel data of line disposed above the to-be-interpolated line, and G, H and I are pixel data of line disposed below the to-be-interpolated line.

Using the line image data C2 and C3, the edge pixel value generating unit 134 selects the edge directionalities of several angles, such as 90°, right/left 9°, right/left 11°, right/left 14°, right/left 18°, right/left 26°, right/left 45° and right/left 64°, and then calculates the average values p1, rp1 to rp7 and lp1 to lp7 with respect to the edge directionalities of several angles. The calculated average values are provided to the pixel selecting unit 167. Here, the average values p1, rp1 to rp7 and lp1 to lp7 with respect to the edge directionalities of several angles can be obtained as follows:

average value ($p$) of pixel=$(E+H)/2$ where, E is an image data of line disposed above the to-be-interpolated line, and H is an image data of line disposed below the to-be-interpolated line.

The edge selecting unit 135 calculates the absolute values of the varied values of pixels with respect to the directionalities of several angels by using the current line image data C1 and the delayed line image data C2 to C4, compares the absolute values with the predefined reference values to detect whether or not an edge exists, and outputs the edge existence signal EDGE-EN according to the detection result. The edge existence signal EDGE-EN is provided to the directionality selecting unit 136.

As shown in FIG. 5, the directionality selecting unit 136 includes the right minimum value selecting unit 136a, the left minimum value selecting unit 136b, and the right/left minimum value selecting unit 136c.

The right minimum value selecting unit 136a selects the directionality of the most suitable edge among the directionalities of angles ranging between 0° and 18°. The right minimum value selecting unit 136a receives the difference values d1 and rd1 to rd7 with respect to the directionalities of right edges among the difference values d1, rd1 to rd7 and ld1 to ld7 with respect to the directionalities of several angles which have a possibility of being interpolated. The right minimum value selecting unit 136a ignores the difference value of angles with respect to the directionality having the edge existence signal EDGE-EN of "0", and selects the minimum difference value among the difference values of several angels with respect to the directionalities having the edge existence signal EDGE-EN of "1". The selected value is provided to the right/left minimum value selecting unit 136c.

The left minimum value selecting unit 136b selects the directionality of the most suitable edge among the directionalities of angles ranging between 0° and 18°. The left minimum value selecting unit 136b receives the difference values d1 and ld1 to ld7 with respect to the directionalities of left edges among the difference values d1, rd1 to rd7 and ld1 to ld7 with respect to the directionalities of several angles which have a possibility of being interpolated. The left minimum value selecting unit 136b ignores the difference value of angles with respect to the directionality having the edge existence signal EDGE-EN of "0", and selects the minimum difference value among the difference values of several angels with respect to the directionalities having the edge existence signal EDGE-EN of "1". The selected value is provided to the right/left minimum value selecting unit 136c.

The right/left minimum value selecting unit 136c determines the direction having the minimum value in the right direction minimum value and the left direction minimum value which are respectively inputted from the right minimum value selecting unit 136a and the left minimum value selecting unit 136b, as the final direction and outputs it to the edge direction select signal EDGE-SEL. In other words, if the minimum value with respect to the directionality of the right edge is smaller than that with respect to the directionality of the left edge, the right direction is determined as the final direction of the edge. On the contrary, if the minimum value with respect to the directionality of the left edge is smaller than that with respect to the directionality of the right edge, the left direction is determined as the final direction of the edge.

The pixel selecting unit 137 selects one of the average values p1, rp1 to rp7 and lp1 to lp7 according to the edge direction select signal EDGE-SEL and output the selected average value as the to-be-interpolated intra-field data INTRA0 to the synthesizing part 200.

Meanwhile, as show in FIG. 6, the motion value generating part 140 of FIG. 1 includes the first motion calculating unit 141, the second motion calculating unit 142, the motion boundary maintenance calculating unit 143, the bad edit calculating unit 144, and the film calculating unit 145.

The first motion calculating unit 141 can check whether the pixel-unit motion exists or not by calculating the absolute value of the difference between adjacent pixels disposed at the same position in the line image data A and B outputted from the first and third pixel delay units 111 and 113. If the motion exists, the first motion calculating unit 141 outputs the motion value N-MAX of "1". If no motion exists, the first motion calculating unit 141 outputs the motion value N-MAX of "0". Here, the difference values of the adjacent pixels can use only those of the pixels disposed at the same position as the to-be-interpolated pixel.

The second motion calculating unit 142 detects the minimum motion value M-MIN and the maximum motion value M-MAX by using the line image data C2 of the field T and the line image data C3 of the field T−2. In other words, the existence of the small and large motion by pixel unit can be checked by calculating the absolute values of the difference of the adjacent pixels disposed at the same position in the line image data C2, C3, J1 and J2. If the motion exists, the second motion calculating unit 142 outputs the minimum motion value M-MIN of "1" and the maximum motion value M-MAX of "1". If no motion exists, the second motion calculating unit 142 outputs the minimum motion value M-MIN of "0" and the maximum motion value M-MAX of "0". Here, the difference values of the adjacent pixels can use only those of two pixels disposed above/below the to-be-interpolated pixel.

The motion boundary maintenance calculating unit 143 extracts the motion boundary maintenance condition signal B-CON by calculating the absolute value of the difference between pixels disposed at the same position with respect to the pixels disposed vertically above/below the to-be-interpolated pixel in the line image data A, C2, C3, J1 and J2 and the maximum motion value M-MAX.

The bad edit calculating unit 144 detects the motion degree value BEV used for the bad edit image detection by accumulating the line image data J1 and J2 of the current-field T+2 and the line image data A of the field T+1.

In other words, the motion degree value BEV can be obtained by calculating the difference values (dbe1) between the pixels disposed vertically above in the same position as the to-be-interpolated pixel disposed before two fields in the line image data J1 and J2, and the pixels disposed at the same position as the to-be-interpolated pixel disposed before two fields in the line image data A of the field T+1.

Further, the bad edit calculating unit 144 calculates the difference values (dbe2) between the pixels disposed vertically below in the same position as the to-be-interpolated pixel disposed before two fields in the line image data J1 and J2, and the pixels disposed at the same position as the to-be-interpolated pixel disposed before two fields in the line image data A of the field T+1. Then, the maximum values of the difference values dbe1 and dbe2 are accumulated and divided by the number of pixels contained in the field, thereby obtaining the motion degree value BEV used for the bad edit image detection. Here, the motion degree value BEV can be obtained by accumulating the maximum values or the minimum values.

The film calculating unit 145 detects the motion degree value FV used for the 2:2 film image detection by accumulating the line image data A and the line image data C2 and C3.

In other words, the motion degree value FV can be detected by calculating the absolute value of the difference between the pixels disposed vertically above the to-be-interpolated pixel in the line image data C2 and C3 of the field T, and the pixels disposed at the same position as the to-be-interpolated pixel of the line image data C2 and C3 of the two-field delayed field T in the line image A of the field T+1.

Further, the film calculating unit 146 calculates the absolute values of the difference between the pixels disposed vertically below in the same position as the to-be-interpolated pixel in the line image data C2 and C3 of the field T, and the pixels disposed at the same position as the to-be-interpolated in the line image data A of the field T+1. Then, the absolute values are accumulated to obtain the motion degree value FV used for the 2:2 film image detection. Here, the motion degree value FV can be obtained by accumulating the maximum values or the minimum values among the absolute values of the difference between the to-be-interpolated pixels.

As shown in FIG. 7, the film image processing part 180 includes the first film detecting unit 181, the second film detecting unit 182, the film reference value calculating unit 183, the bad edit detecting unit 184, the film selecting unit 185, and the caption area detecting unit 186. The film image processing part 180 detects whether the inputted original image is the 3:2 film image or the 2:2 film image according to the motion degree values BEV and FV and the motion value N-MAX, and determines the intra-field data to be interpolated according to the detection result.

Using the motion value N-MAX of the intra-field inputted from the motion value generating part 140, the first film detecting unit 181 of the film image processing part 180 shown in FIG. 7 detects whether or not the inputted original image is the 3:2 film image by using a correlation filter having five taps, and outputs the film image recognition signal F-EN1 indicating the 3:2 film image and the inter-field selecting signal FPFS1. As shown in a film interlaced signal of FIG. 11A, T2 and B2 are fields generated in the same frame. T2, B2 and T2_1 are fields that are generated in the same frame, and T4, B4 and T4_1 are fields that are generated in the same frame. By repeating this manner, an image is inputted. In this case, if the current field is T2_1 or T4_1, it is a field that is generated in the same frame as T2 and B2, or T4 and B4. Therefore, it becomes a field having no motion.

In the first film detecting unit 181, a method for detecting the 3:2 film image is carried out by detecting the current field as a field having the motion, if the intra-field motion value N-MAX inputted from the first motion calculating unit 141 of the motion value generating part 140 is more than the predefined reference value. Additionally, if the intra-field motion value N-MAX is less than the predefined reference value, the current field is detected as a field having no motion. As the detection result, if the current field is detected as the field having the motion, a positive integer value is assigned, and if the current field is detected as the field having no field, a negative integer value is assigned.

The assigned integer value is generated in a form of an integer string in a time sequence, and the integer string passes through the correlation filter having taps of multiple of five. If an output value of the correlation filter is larger than the predefined threshold value, the original image is detected as the 3:2 film image, thus outputting the film image recognition signal F-EN1 of "1". If the output value of the correlation filter is smaller than the threshold value, the original image is detected as no 3:2 film image, thus outputting the film image recognition signal F-EN1 of "0". If it is the 3:2 film image, the synchronization of frame is detected considering that one frame of the original image is alternately configured with three or two fields. Then, the synchronization of frame is provided to the film selecting unit 185.

The film reference value calculating unit 183 of the film image processing part 180 uses the motion degree value FV outputted from the motion value generating part 140. The film reference value calculating unit 183 sums the motion degree values FV of the respective pixels in the current field.

Then, if the sum of the motion degree values FV is more than the predefined reference value, the current field is determined as a field having the motion, and then the 2:2 film adaptive reference value is set to "1" and provided to the second film detecting unit 182. If the sum of the motion degree values FV is less than the predefined reference value, the current field is determined as a field having no motion, and then the 2:2 adaptive film reference value is set to "0" and provided to the second film detecting unit 182.

The second film detecting unit 182 detects whether or not the inputted original image is the 2:2 film image by using the motion degree value FV and the 2:2 film adaptive reference value, and outputs the inter-field select signal FPFS2 and the film image recognition signal F-EN2 indicating the 2:2 film image.

Figure 11A:
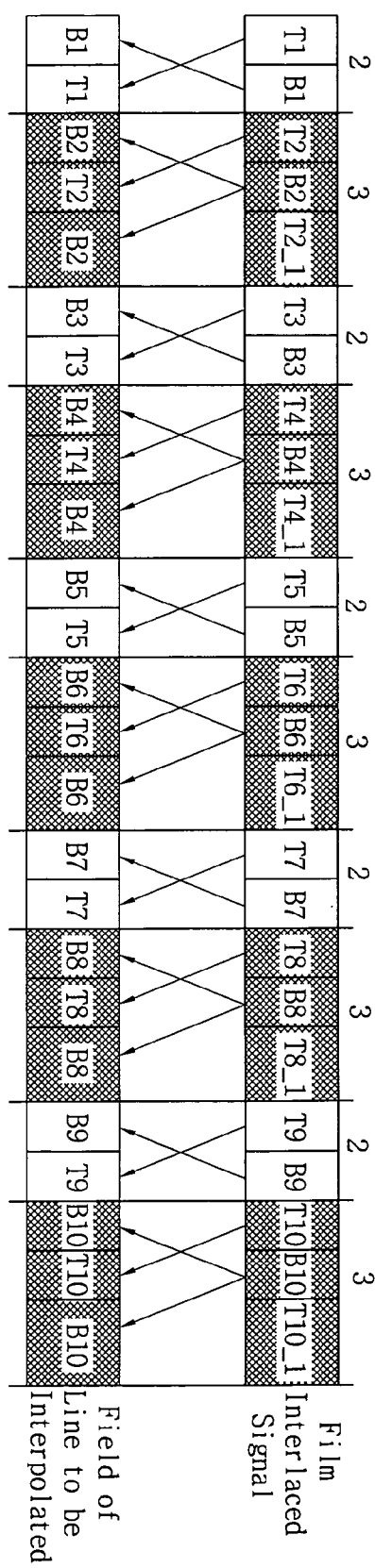
FIGS. 11A and 11B illustrate a concept of the film image in the film image processing part of FIG. 7.
Figure 11B:
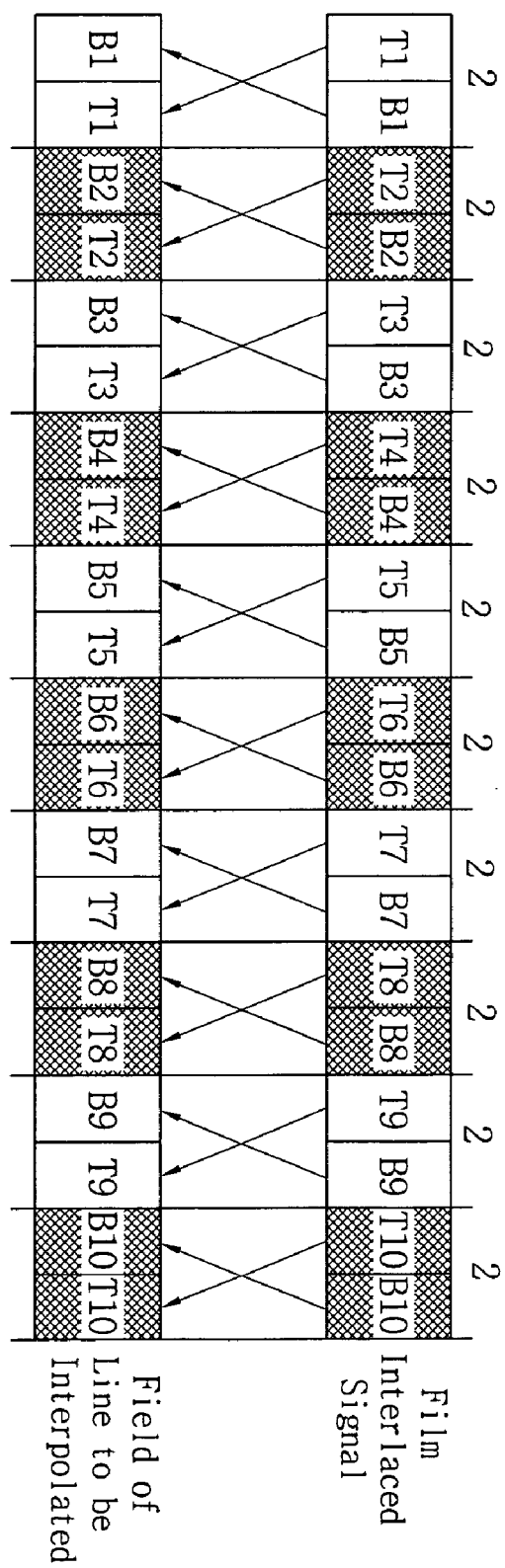

As shown in a film interlaced signal of FIG. 11B, T2 and B2 are fields that are generated in the same frame, and T2 and B2 are fields that are generated in the same frame. T3 and B3 are fields that are generated in the same frame, and T4 and B4 are fields that are generated in the same frame. In this manner, the same frame is inputted repeatedly by two sheets. Therefore, an image of a next field must be interpolated in the first field of two sheets. At this time, the film image recognition signal F-EN2 indicating the 2:2 film image becomes "0".

In the second film detecting unit 182, a method for detecting the 2:2 film image includes the steps of: storing the intra-field motion degree values FV into six fields; adding the remaining four values except for the maximum and minimum values of the six intra-field motion values; and dividing the added value by four to generate an adaptive reference value.

Then, if the case that the intra-field motion degree value FV is larger than the adaptive reference value and the case that the intra-field motion degree value FV is smaller than the adaptive reference value occur in two successive fields, a predefined reference value is added. If the case that the added value is larger than the adaptive reference value extracted before it becomes the predefined reference value and the case that the added value is smaller than the adaptive reference value do not occur in two successive fields, an initialization is performed. If the extracted adaptive reference value is larger than the predefined reference value, it is determined whether or not the corresponding field is the 2:2 film image, and the film image recognition signal F-EN2 of "1" is outputted together with the inter-field select signal FPFS2.

Further, the bad edit detecting unit 184 detects the bad edit image from the 3:2 or 2:2 film image according to the first and second film image recognition signals F-EN1 and F-EN2 by using the motion degree value BEV inputted from the motion value generating part 140, and outputs the film bad edit recognition signal BE-EN.

Herein, a method for detecting the bad edit image in the bad edit detecting unit 184 will be described. If the second film detecting unit 182 detects the 2:2 film image, the intra-field motion degree values BEV are stored into six fields. The remaining four values except for the maximum and minimum values of the six intra-field motion values BEV are added and divided by four to generate an adaptive reference value. If the 2:2 film image is detected, it is determined whether or not the current field has the same frame as the previous field. If the two fields have the same frame, the intra-field motion degree value BEV is compared with the extracted adaptive reference value. If the motion degree value BEV is larger than the adaptive reference value, it is determined that a next field is the bad edit image.

Then, the film bad edit recognition signal BE-EN is provided to the film selecting unit 185.

Further, if the 3:2 film image is detected, the intra-field motion degree values BEV are stored into five fields. The remaining two values except for the two small values and the largest value of the five intra-field motion values BEV are added and then divided by two to generate an adaptive reference value. If the 3:2 film image is detected, it is determined whether or not the current field has the same frame as the previous field. If the two fields have the same frame, the intra-field motion degree value BEV is compared with the extracted adaptive reference value. If the motion degree value BEV is larger than the adaptive reference value, it is determined that a next field is the bad edit image. Then, the film bad edit recognition signal BE-EN is provided to the film selecting unit 185. In this manner, the bad edit image can be detected in the 3:2 film image and the 2:2 film image. Here, the bad edit image can be detected by assigning a predefined reference value without separately calculating the adaptive reference value. Further, the number of the storage field can be determined arbitrarily.

The film selecting unit 185 of the film image processing part 180 selects one film image mode to be interpolated among the film image recognition signals F-EN1 and F-EN2 and the field interpolation select signals FPFS1 and FPFS2 according to the film bad edit recognition signal BE-EN, and outputs the film mode signal EN1 and the inter-field interpolating select signal PFS. As can be seen in FIGS. 11A and 11B, the 3:2 film image and the 2:2 film image are not detected at the same time since field arrangements of the 3:2 film image and the 2:2 film image are different from each other.

If the film bad edit recognition signal BE-EN is "1", it means that the bad edit is detected. Therefore, the film mode signal EN1 indicating the film image is set to "0". The 3:2 film image has the same frames repeated by three sheets and by two sheets, as shown in FIG. 11A. Therefore, an image of a next field must be interpolated in the first field of the three sheets and the first field of the two sheets. At this point, the field interpolating select signal FPFS1 for selecting the to-be-interpolated field in the 3:2 film image becomes "0". The 2:2 film image has the same frames repeated by two sheets, as shown in FIG. 11B. Therefore, an image of a next field must be interpolated in the first field of the two sheets. At this point, the field interpolating select signal FPFS2 for selecting the to-be-interpolated field in the 2:2 film image becomes "0". If it is not the film image or if the bad edit is detected, the image of the previous field must be the inter-field to-be-interpolated image data, so that the field interpolating select signal becomes "1". If the field interpolating select signal FPFS1 for selecting the field to be interpolated in the 3:2 film image is "1", the inter-field interpolating select signal PFS for selecting the field to be interpolated in the film image becomes the field interpolating select signal FPFS1 for selecting the field to be interpolated in the 3:2 film image. If the field interpolating select signal FPFS2 for selecting the field to be interpolated in the 2:2 film image is "1", the inter-field interpolating select signal PFS for selecting the field to be interpolated in the film image becomes the field interpolating select signal FPFS2 for selecting the field to be interpolated in the 2:2 film image.

As shown in FIG. 8, the bad edit detecting unit 184 includes the first and second bad edit detecting units 184a and 184c, the first and second film bad edit reference value calculating units 184b and 184d, and the first logic summation unit 184e.

The first film bad edit reference value calculating unit 184b outputs the 3:2 bad edit detection adaptive reference value by using the motion degree value BEV inputted from the motion value generating part 140. The first film bad edit detecting unit 184a outputs the bad edit recognition signal BE-EN1 indicating the bad edit image in the 3:2 film image by using the motion degree value BEV, the film image recognition signal F-EN1 indicating the 3:2 film image, and the 3:2 bad edit detection adaptive reference value.

Further, the second film bad edit reference value calculating unit 184d outputs the bad edit recognition signal BE-EN2 indicating the bad edit image in the 2:2 film image by using the motion degree value BEV. The second film bad edit detecting unit 184c outputs the bad edit recognition signal BE-EN2 indicating the bad edit image in the 2:2 film image by using the motion degree value BEV, the film image recognition signal F-EN2 indicating the 2:2 film image, and the 2:2 bad edit detection adaptive reference value. The first logic summation unit 184e logically sums the bad edit recognition signal BE-EN1 of the 3:2 film image and the bad edit recognition signal BE-EN2 of the 2:2 film image and outputs the film bad edit recognition signal BE-EN.

Figure 12A:
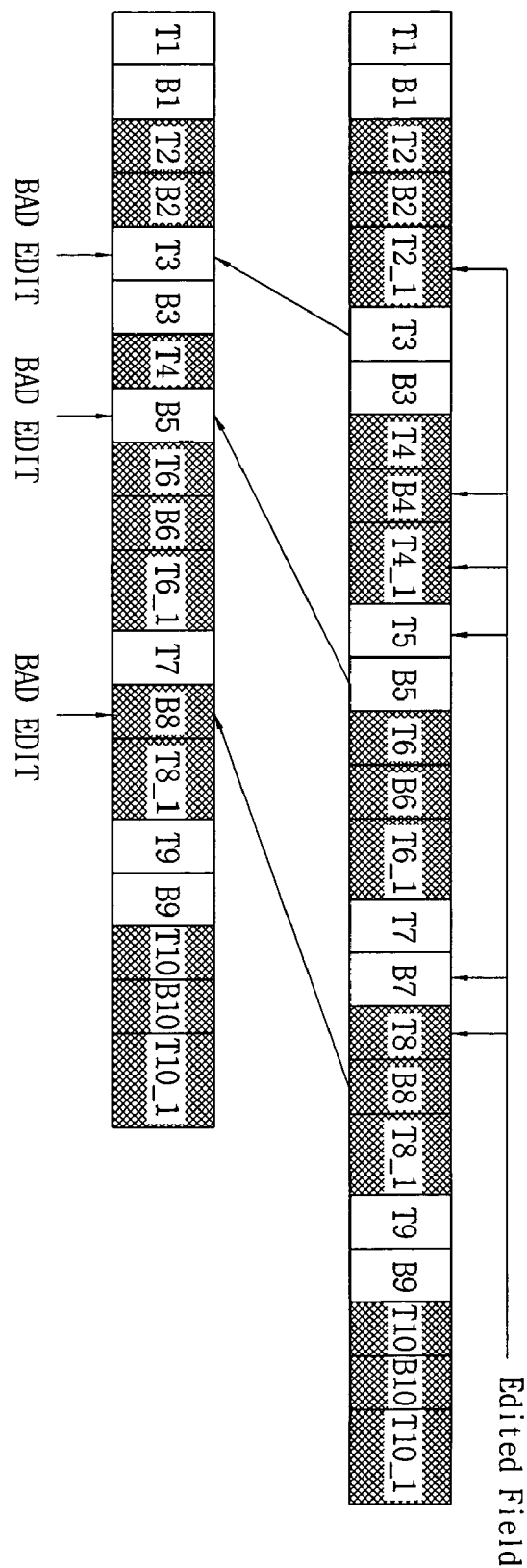
FIGS. 12A and 12B illustrate a concept of the bad edit image in the bad edit detecting unit of FIG. 8.
Figure 12B:
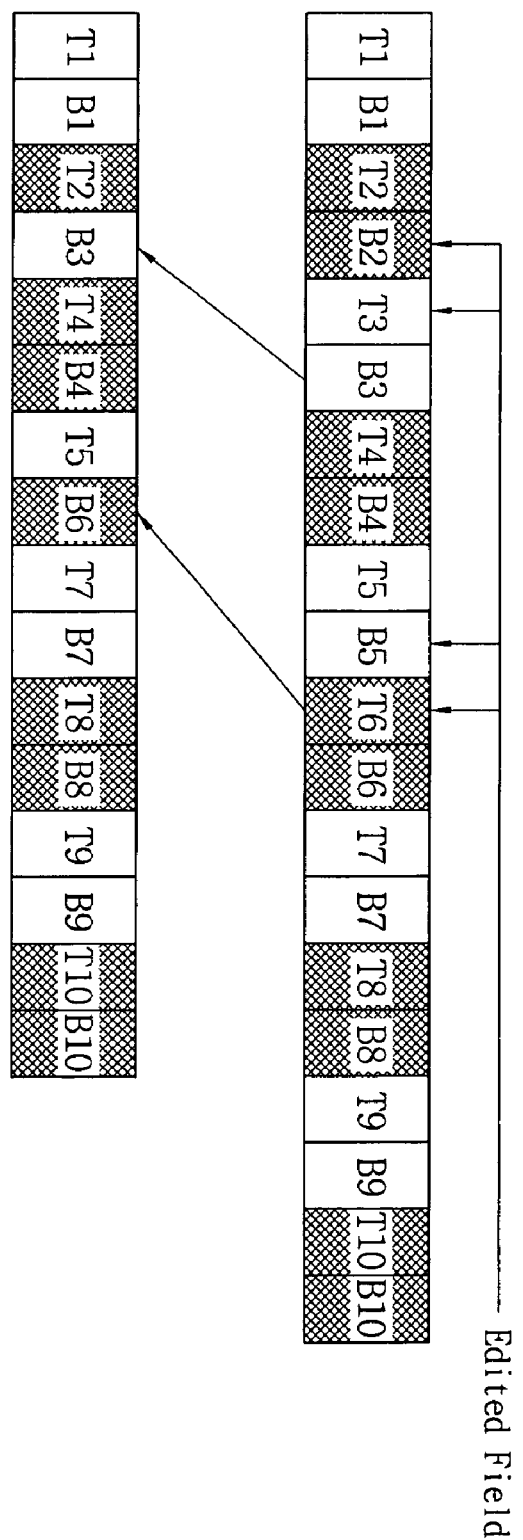

FIG. 12A illustrates a concept of the bad edit image in the 3:2 film image, and FIG. 12B illustrates a concept of the bad edit image in the 2:2 film image. If the film image is processed without detecting portions represented by "bad edit" in FIGS. 12A and 12B, step patterns and horizontal moire patterns may occur in the boundaries. Accordingly, the first and second film bad edit detecting units 184a and 184c detect the bad edit only in the film image.

As shown in FIG. 9, the caption area detecting unit 186 accumulates the motion degree values BEV of the bad edit, which are calculated by the bad edit calculating unit 144 of the motion value generating part 140, during arbitrary fields according to the film mode signal EN1 and the caption vertical/horizontal position signals CVP and CHP, compares the accumulated value with the motion value obtained at the caption area, detects whether or not the next field is the still caption or the motion caption through the still caption detecting unit 186a and the motion caption detecting unit 186b, and outputs the still caption recognition signal CS-EN and the motion caption recognition signal CM-EN. The still caption recognition signal CS-EN and the motion caption recognition signal CM-EN are logically summed through the second logic summation unit 186c and outputted as the caption display mode signal EN5. In other words, the caption area detecting unit 186 operates only when the film mode signal EN1 indicating the film image is "1" and also in the caption area responsive to the caption vertical/horizontal position signals CVP and CHP. If it is not the caption area, the caption area detecting unit 186 outputs "0". In other words, if the film image and the caption image in the caption area are detected, "1" is outputted, and if it is detected as non-caption image in the caption area, "0" is outputted. In the case of the 2:2 or 3:2 film image, the caption area is defined by setting the predefined horizontal and vertical positions, thus setting the caption area differently from the film area.

Figure 13:
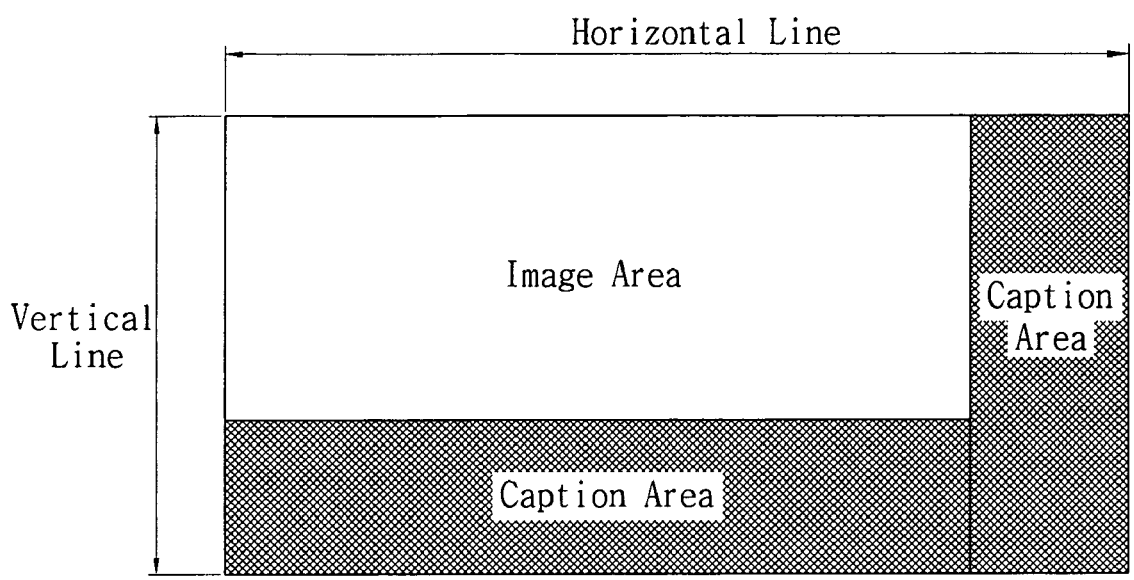
FIG. 13 illustrates a concept of the caption region in the caption area detecting unit of FIG. 9.

FIG. 13 illustrates a concept of the caption area in the caption area detecting unit 186 of FIG. 9. The film area and the caption area are separately operated when the caption area is defined in the film area.

The caption is not the film image. Therefore, if the caption area is not defined, step patterns and horizontal moire patterns may occur at the boundaries in the still caption or the motion caption. In the case of the still caption, horizontal moire patterns may occur in the caption when the caption appears or disappears. In the case of the motion caption, step patterns and horizontal moire patterns may occur at the boundaries.

The history control part 150 of FIG. 1 detects the history value HTV, which can use information on several fields, by using the motion value N-MIN and the minimum motion value M-MAX. The history value HTV is provided to the fast image processing part 160, the motion boundary maintenance image processing part 170 and the inter-field noise image processing part 175.

In other words, in case the motion value N-MAX inputted from the first motion calculating unit 141 is less than the predefined reference value, or in case the minimum motion value M-MIN inputted from the second motion calculating unit 142 is more than the reference value, the history control part 150 judges the cases as the existence of the motion and subtracts a predefined value. On the contrary, in case the motion value N-MAX is less than the predefined reference value and the minimum motion value M-MIN is less than the reference value, the history control part 150 judges the case as no existence of the motion and adds a predefined value.

If the motion value obtained in the above manner is less than "0", "0" is assigned. If the calculated value exceeds the number of fields set in order for calculation, the number of fields is assigned. In the other cases, the calculated value is outputted as the history value HTV.

Further, the fast image processing part 160 detects whether or not the current pixel has the fast image by using the motion value N-MAX, the data VFC indicating the face area in order to determine the motion image, and the history value HTV. If the fast motion exists, the fast image motion signal EN2 of "1" is outputted, and if no fast motion exists, the fast image motion signal EN2 of "0" is outputted.

In order to detect the fast motion image of the pixel, the fast image processing part 160 extracts the image as the fast motion image if the motion value N-MAX is more than a predefined reference value. Additionally, if the motion value N-MAX and the history value HTV are less than the predefined reference value and the image is extracted as the face area, the to-be-interpolated pixel is extracted as the fast motion image.

The motion boundary maintenance image processing part 170 detects whether or not a corresponding pixel is the motion boundary maintenance image by using the motion value N-MAX, the motion boundary maintenance condition signal B-CON and the history value HTV. In case the pixel is the motion boundary image, the motion boundary maintenance signal EN3 of "1" is outputted. In case the pixel is not the motion boundary image, the motion boundary maintenance signal EN3 of "0" is outputted. At this point, if the motion value N-MAX and the motion boundary maintenance condition signal B-CON are less than the predefined reference value and the history value HTV is more than the predefined reference value, the to-be-interpolated pixel is extracted as the motion boundary maintenance image and provided to the synthesizing part 200.

The inter-field noise image processing part 175 extracts the adjacent inter-field noise signal EN4 by using the motion value N-MAX and the history value HTV. In other words, if the motion value N-MAX and the history value HTV are less than the predefined reference value, the to-be-interpolated pixel is extracted as the inter-field noise image and provided to the synthesizing part 200.

The still image processing part 190 counts accumulatively the motion value N-MAX and the motion degree value FV to detect whether or not a current field is a still image. If the given field is the still image, the still image signal EN6 of "1" is outputted, and if the given field is not the still image, the still image signal EN6 of "0" is outputted. In other words, the intra-field motion values N-MAX calculated by the first motion calculating unit 145 are accumulated to extract the motion degree value. If the extracted motion degree value is less than the predefined reference value, the motion values are accumulated while the fields are progressing. On the contrary, if the motion degree value is more than the predefined reference value, the accumulated value is initialized while the fields are progressing, and thus set to "0". If the extracted value is more than the predefined reference value, the given field is determined as the still image and the still image signal EN6 of "1" is outputted. Further, if the motion degree value FV extracted by the film calculating unit 145 is more than the predefined reference value, the still image processing part 190 judges that the given field is not the still image, and outputs the still image signal EN6 of "0" to the synthesizing part 200.

Meanwhile, if the film mode signal EN1 is "1" and the caption display mode signal EN5 indicating the still caption or the motion caption in the caption area is "0", the synthesizing part 200 selects the inter-field data INTER0, which is inputted from the field processing part 110, as the to-be-interpolated data. If the still image signal EN6 is "1", it means that the field is the still image. Therefore, the synthesizing part 200 selects the inter-field data INTER0 as the to-be-interpolated data and outputs it through the output terminal 220. Except for the two conditions, if the fast image motion signal EN2 of "1" is inputted from the fast image processing part 160, it means that the fast motion exists. Therefore, the synthesizing part 200 selects the intra-field data INTRA0 of the intra-field pixel processing part 130 as the to-be-interpolated data. If the fast image motion signal EN2 is "0" and the motion boundary maintenance signal EN3 is "1", the boundary portion exists between motion image and the still image. Therefore, the synthesizing part 200 selects the inter-field data INTER0 as the to-be-interpolated data. In order to prevent the misjudgment that the motion exists because noise signal exists in front and rear fields disposed at the same position as the inter-field to-be-interpolated pixel, if the fast image motion signal EN2 is "0" and the inter-field noise signal EN4 is "1", the inter-field data INTER0 is selected as the to-be-interpolated data. Further, if the fast image motion signal EN2, the motion boundary maintenance signal EN3 and the inter-field noise signal EN4 are "0", the synthesizing part 200 selects one of the intra-field data INTRA0 and the inter-field data INTER0 according to the maximum motion value M-MAX and outputs it through the output terminal 220. If the maximum motion value M-MAX is less than the predefined value, horizontal moire pattern phenomenon occurs due to a small pixel difference. Therefore, if the absolute value of the difference between the inter-field data INTER0 and the intra-field data INTRA0 is less than the predefined value, the intra-field data INTRA0 is selected and outputted thorough the output terminal 220.

Meanwhile, according to the related art, the picture quality is degraded after the progressive scanning since the interpolation is generally performed by the intra-field vertical interpolation method or the line repetition method, not by interpolating only a boundary portion of an angle of 45° using one line storage device or by automatically detecting the fast motion image or the film image the fast image processing part or the film image processing part. The picture quality is degraded since the inter-field noise pixels are not detected and thus the interpolation is performed using the noise signal. A noise occurs at the boundary portion between the motion image and the still image after the progressive scanning since pixels that must maintain the motion boundary are not detected. The step patterns and the horizontal moire patterns occur at the boundary portions since the bad edit images due to the incorrect edition of the film image are not detected. In case the caption area is not defined or in case the caption is the still caption or the motion caption, the step patterns and the horizontal moire patterns occur at the boundary portion. Unlike the related art, the present invention can solve the phenomenon that the straight boundary of an oblique shape seems to be the step shape, which occurs due to a time difference between two fields when the interlaced scanning is converted into the progressive scanning. Thus, the boundary portions are connected in a shape of a smooth straight. Also, the present invention can solve the problem that causes the horizontal moire pattern afterimage with respect to the partial image having the fast motion, and can prevent the noise that occurs at the partial image being still during several fields in the image having many motions. Further, the present invention can display the noise occurring in the still image in the resolution close to the photograph, and can solve the problem of the horizontal moire pattern afterimage occurring at the image having less motion. Furthermore, the present invention can prevent the step pattern phenomenon, which occurs in the incorrectly extracted film image, by restoring the image close to the original image with respect to the film mode image and extracting the bad edit image. By setting the caption area, the present invention can prevent the horizontal moire patterns that occur when the still caption appears or disappears. The present invention can also prevent the step pattern phenomenon occurring at the motion caption, thereby improving the picture quality.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for deinterlacing an image signal, comprising the steps of:
    extracting a first motion value by using data of fields disposed before one field and three fields from a current field with respect to each pixel to be interpolated, a second motion value by using data of fields disposed before two and four fields from the current field, and a third motion value by using a data of the current field or data of fields disposed before four fields, one field and two fields from the current field, respectively;
    extracting motion values by using the data of the current field and the before-one-field data, and accumulating the extracted motion values to extract a first motion degree value;
    extracting a fourth motion value by using the before-one-field data and the before-two-field data, and accumulating the extracted fourth motion value to extract a second motion degree value;
    extracting a face area and searching an edge directionality of pixel by using pixels of a current line disposed within the field disposed before the two fields from the current field and by using pixels of lines disposed before one line, two line and three lines from the current line, and calculating an intra-field to-be-interpolated pixel value;
    determining whether or not the current field is a fast motion image by using the first motion value, the face area and a history value, the history value being calculated using the first and the second motion values;
    extracting a motion boundary maintenance image by using the first and third motion values and the history values, and a noise image between two adjacent fields by using the first motion value and the history value, respectively;
    sequentially accumulating/counting the first motion value and the second motion degree value, and determines whether or not the current field is a still image field;
    sequentially accumulating the first motion value and the first and second motion degree values during several fields, and determining whether or not the current field is a film image by using the accumulated value;
    if the current field is the film image, extracting a bad edit image and still and motion captions in a caption area by using the first motion degree value;
    performing an interpolation by using the intra-field to-be-interpolated pixel value, if the current field is not the film image, if the current field is the bad edit in the film image, if the current field is the still or motion caption in the caption area, and if the current field is the fast motion image;
    calculating an interpolation pixel value by performing the inter-field interpolation, if the current field meets the conditions of the step (j) and is the still image, if it is determined that there is no pixel motion according to the second motion value, if the current field is not a pixel contained in the fast motion image, if the current field is determined as a pixel contained in the motion boundary maintenance image, and if the current field is determined as a pixel contained in the inter-field noise image; and
    if the current field is determined as the still image and if the second motion value of each pixel is small, comparing the intra-field pixel value with the inter-field pixel value, and if the resulting value is less than a predefined reference value, determining the current field as an image having a small motion, and performing an interpolation by using the intra-field to-be-interpolated pixel value.

2. The method of claim 1, further comprising the steps of:
    setting the to-be-interpolated field to a field disposed before two fields from the current field; and
    setting the line of the to-be-interpolated field between the before-two-line line and the before-three-line line of the current field.

3. The method of claim 1, wherein the extraction of the first motion value is carried out by calculating an absolute value of a difference between adjacent pixels disposed at the same position in the before-one-field field and the before-three-field field.

4. The method of claim 1, wherein the extraction of the second motion value is carried out by calculating an absolute value of a difference between pixels disposed at the same position in the before-two-field filed and the before-four-field field.

5. The method of claim 1, wherein the extraction of the face area includes the steps of:
    calculating a first difference value of horizontal pixels in the lines disposed before one line and two lines within the field disposed before two fields;
    calculating a second difference value of pixels disposed in a horizontal direction in the lines disposed before one line and two lines;

calculating a third difference value of vertical pixels, right/left 45° pixels and right/left 26° pixels in the current line and the line disposed before one line;

calculating a fourth difference value of vertical pixels right/left 45° pixels and right/left 26° pixels in the lines disposed before two lines and three lines;

calculating a fifth difference value of vertical pixels right/left 45° pixels and right/left 26° pixels in the lines disposed before one line and two lines; and extracting the face area, if the first and second difference values are less than a predefined reference value or if the third to fifth difference values are less than the predefined reference value.

6. The method of claim 5, wherein in the extraction of the face area, the first to fifth difference values are calculated only in the lines disposed before one line and two lines.

7. The method of claim 1, wherein the extraction of the history value includes the steps of:

if minimum values of the first and second motion values are more than a reference value, determining that the motion exists and subtracting a predefined value;

if the minimum values of the first and second motion values are less than the reference value, determining that no motion exists and adding a predetermined value; and assigning "0" if the subtracted value is less than "0", assigning the number of fields if the subtracted value exceeds the number of fields defined for calculation, and extracting the subtracted value in the other cases.

8. The method of claim 1, wherein the current field is extracted as the fast motion image if the first motion value is more than a predefined reference value, and the to-be-interpolated field is extracted as the fast motion image if the history value is less than a predefined reference value and the face area is extracted.

9. The method of claim 1, wherein the extraction of the fourth motion value includes the steps of:

calculating an absolute value of a difference between a pixel disposed vertically above the to-be-interpolated pixel of the field disposed before two fields and pixels disposed at the same position as the to-be-interpolated pixel of the field disposed before two fields in a field disposed before one field from the current field; and calculating an absolute value of a difference between a pixel disposed vertically below the to-be-interpolated pixel of the field disposed before two fields and pixel-s disposed at the same position in the field disposed before one field.

10. The method of claim 1, wherein the to-be-interpolated pixel is extracted as the motion boundary maintenance image if a minimum value of the second motion value, the first motion value and the fourth motion value are less than a predefined reference value and the history value is more than the reference value.

11. The method of claim 1, wherein the to-be-interpolated pixel is extracted as the inter-field noise image if a minimum value of the second motion value and the history value are less than a predefined reference value and the first motion value is more than a predefined reference value.

12. In a device for interpolating lines of an image signal, an apparatus for deinterlacing an image signal comprising:

an intra-field pixel processing means for detecting a face area and a to-be-interpolated data within a field by using pixels of a current line disposed within a field disposed before two fields from a current field and by pixels of lines disposed before one line, two line and three lines with respect to the current line;

a motion value generating means for detecting first to third motion values and first and second motion degree values by using a before-one-field data and a before-three-field data of the current field, a before-two-field data and a before-four-field data of the current field, the current field or the before-four-field data, the before-one-field data and the before-two-field data of the current field;

a history control means for detecting a history value by using the first and second motion values obtained at the motion value generating means, the history value using information on several fields;

a fast image processing means for detecting a fast motion image by using the first motion value, the face area and the history value;

a film image processing means for detecting a film image and a caption area according to the first and second motion degree values, the first motion value and an external caption vertical/horizontal position signal and determining a to-be-interpolated field data according to the detected film image and caption area;

a still image processing means for accumulating/counting the first motion value and the second motion degree value to detect a still image;

an inter-field noise image processing means for detecting an adjacent inter-field noise image by using the first motion value and the history value;

a motion boundary maintenance image processing means for detecting a motion boundary maintenance image by using the first and third motion values and the history value; and a synthesizing means for selectively interpolating the intra-field to-be-interpolated data, the before-one-field inter-field data and the before-three-field inter-field data according to the second motion value, the fast motion image, the still image, the inter-field noise image, the motion boundary maintenance image, the film image and the caption image.

13. The apparatus of claim 12, wherein the intra-field pixel processing means includes:

an intra-field edge processing unit for searching an adjacent edge directionality of a to-be-interpolated pixel by using the current-line pixel, the one-line delayed pixel, the two-line delayed pixel and the three-line delayed pixel in the field disposed before three fields from the current field; and a face area detecting unit for detecting the face area by comparing a predefined reference value with difference value of pixels having a predetermined slope among directionalities of several angles by using upper and lower pixels among the current-line pixel, the one-line delayed pixel, the two-line delayed pixel and the three-line delayed pixel in the field disposed before three fields from the current field.

14. The apparatus of claim 13, wherein the intra-field edge processing unit includes:

an edge pixel difference generating unit for outputting the difference values with respect to the edge directionalities of several angles by using the one-line delayed pixel and the two-line delayed pixel;

an edge pixel value generating unit for outputting pixel average values with respect to the edge directionalities of several angles by using the one-line delayed pixel and the two-line delayed pixel;

an edge selecting unit for calculating varied values of pixels with respect to the directionalities of several angles by using the current-line pixel, the one-line delayed pixel, the two-line delayed pixel and the three-line delayed pixel, for comparing the varied values with a reference value to detect whether or not an edge exists, and for outputting an edge existence signal;

a directionality selecting unit for obtaining a directionality of a to-be-finally-interpolated edge according to the edge existence signal and the difference values with respect to the directionalities of several angles, and outputting an edge direction select signal; and a pixel selecting unit for selecting one of the average values according to the edge direction select signal and outputting a to-be-interpolated pixel value.

15. The apparatus of claim 14, wherein the directionality selecting unit includes:

a right minimum value selecting unit for selecting a right minimum value with respect to the edge directionality of "1" by using the difference values and the edge existence signal;

a left minimum value selecting unit for selecting a left minimum value with respect to the edge directionality of "1" by using the difference values and the edge existence signal;

a right/left minimum value selecting unit for selecting a minimum value of the selected right and left minimum values and outputting an edge direction select value to be interpolated.

16. The apparatus of claim 12, wherein the motion value generating means includes:

a first motion calculating unit for detecting the first motion value by using the one-field delayed data and the three-field delayed data;

a second motion calculating unit for detecting the second motion value having the minimum motion value and the maximum motion value by using the two-field delayed data and the fourth-field delayed data;

a motion boundary maintenance calculating unit for detecting the third motion value by using the current-field data, the four-field delayed data and the one-field delayed data of the current field, the two-field delayed data and the maximum value of the second motion value;

a bad edit calculating unit for detecting the first motion degree value by accumulating the current-field data and the one-field delayed data of the current field; and a film calculating unit for detecting the second motion degree value used for 2:2 film image detection by accumulating the one-field delayed data and the two-field delayed data.

17. The apparatus of claim 12, wherein the film image processing means includes:

a first film detecting unit for accumulating the first motion values of pixels during several fields in sequence, and comparing the accumulated value with a reference value to detect whether or not the current input image is a 3:2 film image;

a film reference value calculating unit for accumulating the second motion degree values, and comparing the accumulated value with the reference value to generate a 2:2 film adaptive reference value;

a second film detecting unit for accumulating the second motion values of pixels during several fields in sequence, and comparing the accumulated value with the film adaptive reference value to detect whether or not the current input image is a 2:2 film image;

a bad edit detecting unit for detecting a bad edit image according to a film image mode detected from the first and second film detecting units by using the first motion degree value;

a film selecting unit for selecting a to-be-interpolated field in the film image according to the detected film mode and the bad edit image mode; and a caption area detecting unit for defining the caption area according to the selected film mode signal by using a previously set caption vertical/horizontal position signal and the first motion degree value, and detecting the caption image in the caption area.

18. The apparatus of claim 17, wherein the bad edit detecting unit includes:

first and second film bad edit reference value calculating units for accumulating the first motion degree value during arbitrary fields, calculating the remaining values except a maximum value and a minimum value among the motion degree values of the accumulated arbitrary fields, and generating a 3:2 bad edit detection adaptive reference value and a 2:2 bad edit detection adaptive reference value, respectively;

a first film bad edit detecting unit for comparing the 3:2 bad edit detection adaptive reference value with the first motion degree value according to the 3:2 film image mode to detect that a next field is the 3:2 film bad edit image;

a second film bad edit detecting unit for comparing the 2:2 bad edit detection adaptive reference value with the first motion degree value according to the 2:2 film image mode to detect that a next field is the 2:2 film bad edit image; and a first logic summation unit for performing a logic summation of the 3:2 and 2:2 film bad edit images detected by the first and second film bad edit detecting units.

19. The apparatus of claim 17, wherein the caption area detecting unit includes:

still caption and motion caption detecting units for accumulating the first motion degree values during arbitrary fields according to the film image mode and the caption vertical/horizontal position signals, comparing the accumulated value with the motion value obtained at the caption area, and detecting that a next field is the still caption and the motion caption, respectively; and a second logic summation unit for performing a logic summation of the still caption and the motion caption.

* * * * *